US009169693B2

(12) United States Patent
Honeycutt

(10) Patent No.: US 9,169,693 B2
(45) Date of Patent: Oct. 27, 2015

(54) MOBILE ACCESS UNIT AND CAGE

(71) Applicant: Safe Rack LLC, Andrews, SC (US)

(72) Inventor: Robert Honeycutt, Pawleys Island, SC (US)

(73) Assignee: Safe Rack LLC, Andrews, SC (US)

( * ) Notice: Subject to any disclaimer, the term of this patent is extended or adjusted under 35 U.S.C. 154(b) by 0 days.

(21) Appl. No.: 14/336,579

(22) Filed: Jul. 21, 2014

(65) Prior Publication Data

US 2014/0326537 A1 Nov. 6, 2014

Related U.S. Application Data

(62) Division of application No. 12/837,480, filed on Jul. 15, 2010.

(60) Provisional application No. 61/244,016, filed on Sep. 18, 2009.

(51) Int. Cl.
*E06C 1/39* (2006.01)
*E06C 5/02* (2006.01)
*E06C 7/04* (2006.01)
*E06C 5/20* (2006.01)
*E06C 7/42* (2006.01)
*E06C 5/04* (2006.01)

(52) U.S. Cl.
CPC ... *E06C 5/02* (2013.01); *E06C 1/39* (2013.01); *E06C 5/04* (2013.01); *E06C 5/20* (2013.01); *E06C 7/04* (2013.01); *E06C 7/42* (2013.01)

(58) Field of Classification Search
USPC .............. 182/107–109, 127, 63.1, 64.1, 68.1, 182/68.2, 68.3, 69.4, 69.6, 113, 115, 141, 182/130–132, 101, 102
See application file for complete search history.

(56) References Cited

U.S. PATENT DOCUMENTS

| | | | |
|---|---|---|---|
| 1,926,696 A | 9/1933 | Murphy | |
| 2,829,814 A * | 4/1958 | Warner | 182/17 |
| 2,982,379 A | 5/1961 | Fisher | |
| 3,007,540 A * | 11/1961 | Reinhardt | 182/27 |
| 4,390,080 A * | 6/1983 | Bushnell, Jr. | 182/115 |
| 4,679,657 A | 7/1987 | Bennett et al. | |
| 5,042,612 A | 8/1991 | Bennett et al. | |
| 5,042,614 A * | 8/1991 | Rainey | 182/22 |
| 5,385,215 A | 1/1995 | Williams et al. | |
| 5,392,878 A | 2/1995 | Bennett et al. | |
| 6,390,152 B1 | 5/2002 | Donovan et al. | |
| 6,405,831 B1 | 6/2002 | Daniel, III | |
| 6,607,053 B1 | 8/2003 | Warren | |

(Continued)

OTHER PUBLICATIONS

Definiition of 'obliquely' found in Action Based on WordNet 3.0, Farlex clipart collection. © 2003-2012 Princeton University, Farlex Inc.*

(Continued)

*Primary Examiner* — Daniel Cahn
(74) *Attorney, Agent, or Firm* — Nelson Mullins Riley & Scarborough, LLP

(57) ABSTRACT

Fall restraint equipment comprising a mobile access unit having a mobile platform portion, a ladder portion, and a cage portion. The components of the fall restraint equipment are formed from butterflying, lasering, cutting, bending, and/or stamping continuous pieces of tubular and sheet metal. The components of the mobile access unit are modular and include adapters of varying height that cause the mobile access unit to exhibit varying height.

17 Claims, 37 Drawing Sheets

(56) References Cited

U.S. PATENT DOCUMENTS

| | | | |
|---|---|---|---|
| 6,655,497 B1* | 12/2003 | Weatherall | 182/108 |
| 6,926,241 B2* | 8/2005 | Garrett | 248/229.1 |
| 7,140,467 B2 | 11/2006 | Cook | |
| 7,216,741 B2 | 5/2007 | MacDonald et al. | |
| 7,661,372 B2 | 2/2010 | Lombardi | |
| 7,950,095 B2 | 5/2011 | Honeycutt et al. | |
| 2003/0057021 A1* | 3/2003 | Huber | 182/127 |
| 2005/0241878 A1 | 11/2005 | Cook | |
| 2006/0054392 A1 | 3/2006 | MacDonald et al. | |
| 2007/0284190 A1* | 12/2007 | Chady | 182/107 |
| 2008/0105489 A1* | 5/2008 | Garrett | 182/45 |
| 2009/0114128 A1 | 5/2009 | Lombardi | |
| 2009/0229917 A1 | 9/2009 | Berkbuegler | |
| 2011/0225794 A1 | 9/2011 | Honeycutt et al. | |

OTHER PUBLICATIONS

Definition for "cage" and "unitary" referenced on p. 6 and cited in Examiner's list of references in Office Action issued on Apr. 25, 2013 in parent U.S. Appl. No. 12/837,480.

Definition for "cage" and "continuous" cited on p. 7 and cited in Examiner's list of references in Office Action issued on Oct. 10, 2012 in parent U.S. Appl. No. 12/837,480.

* cited by examiner

MOBILE ACCESS UNIT AND CAGE

CROSS-REFERENCE TO RELATED APPLICATIONS

This application is a divisional of U.S. application Ser. No. 12/837,480, filed Jul. 15, 2010, which claims the benefit of U.S. Provisional Application No. 61/244,016, entitled "Cage" and filed on Sep. 18, 2009. These applications are hereby incorporated by reference as if set forth verbatim herein and relied upon for all purposes.

FIELD OF THE INVENTION

The present invention relates generally to fall restraint equipment components. More particularly, the present invention relates to a mobile access unit configured to aid in the unloading of material from containers. The present invention also relates to cages configured to be used with the mobile access unit or with other fall restraint equipment.

BACKGROUND OF THE INVENTION

Typically, fall restraint equipment and its components are manufactured by cutting and welding stock pieces of material together. The stock material commonly exhibits a predefined configuration, size, and arrangement. As a result, the stock material must be plasma cut to the desired shape and/or size. The resulting pieces are then welded together to form a component. To accomplish this, a surface of one piece is placed flat against a surface of another, and the connection between the two is then welded. As a result, the strength of the formed component is limited at least in part by the weld holding the two pieces together. Once the component is formed, it is attached to other components that have been formed in the same manner by welding the two components together. Similarly, the strength of the resulting equipment is limited at least in part by the weld holding its components together.

Additionally, manufacturing equipment in this manner is both time-consuming and costly. Moreover, the drilling and cutting of the stock materials must be accomplished with precision in order to create a stable end product. Variances greater than an acceptable level render the smaller pieces unusable, which are typically discarded as it is often unfeasible to use them in another product once they have been drilled or cut. Moreover, if other parts cannot be cut or drilled from the remaining portions of the stock materials, they too are discarded. Further, different types and sizes of the metal stock material must be kept on hand in order to form the components to be welded together. The inefficient yet inescapable use of stock material also increases the costs associated with manufacturing fall restraint equipment.

SUMMARY OF THE INVENTION

The present invention recognizes and addresses the foregoing considerations, and others, of prior art construction and methods.

In this regard, one aspect of the invention provides a cage for fall restraint equipment. The cage comprises a top rail formed from a continuous piece of tubular metal, a bottom rail formed from a continuous piece of circular, tubular metal, and an upright formed from a continuous piece of tubular metal. The upright defines a first aperture configured to receive a first end of the top rail and defines a second aperture configured to receive a first end of the bottom rail.

According to another aspect, the present invention provides a method for manufacturing a cage for fall restraint equipment. The method comprises the steps of bending a first continuous piece of tubular metal at a plurality of first predefined locations to form a relatively rectangular top rail, where the top rail defines at least one top rail end; bending a second continuous piece of tubular metal at a plurality of second predefined locations to form a relatively rectangular bottom rail, wherein the bottom rail defines at least one bottom rail end; cutting a third continuous piece of tubular metal to define a first aperture and a second aperture, wherein the first aperture is configured to receive the at least one top rail end and the second aperture is configured to receive the at least one bottom rail end; inserting the at least one top rail end into the first aperture; and inserting the at least one bottom rail end into the second aperture.

Yet another aspect of the present invention provides a mobile access unit comprising a ladder portion including a ladder and a mobile platform. The mobile platform is configured to receive a first pair and a second pair of adapters. The first and second pair of adapters are configured to connect to the ladder portion. The second pair of adapters is greater in height than the first pair of adapters so that the mobile access unit exhibits a greater height when the mobile platform receives the second pair of adapters than when the mobile platform receives the first pair of adapters.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 29b is a top planar view of the base portion of FIG. 29a;

Figure 1:
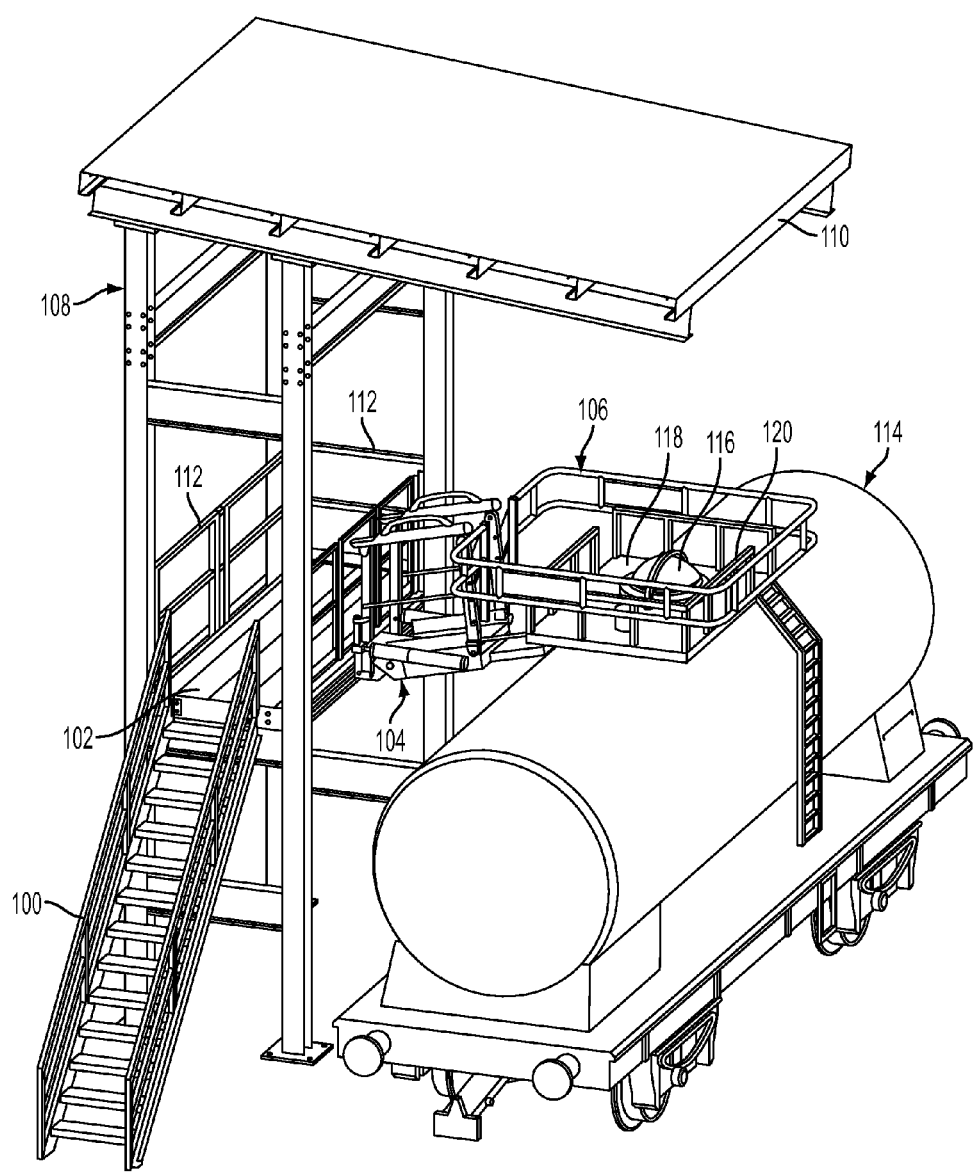
FIG. 1 is a perspective view of fall restraint equipment in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Fall restraint equipment may be used to unload material from a railcar or other storage container. Examples of fall restraint equipment may be found in U.S. Pat. No. 7,950,095, entitled "Gangway and Method of Manufacturing Same" and granted on May 31, 2011; U.S. Pat. No. 8,261,393, entitled "Fall Restraint Equipment Component and Method for Manufacturing the Same" and granted on Sep. 11, 2012; U.S. Publication No. 2010/0031455, entitled "Fall Restraint Equipment Component and Method for Manufacturing the Same" and published on Feb. 11, 2010; U.S. Pat. No. 8,341,821, entitled "Fall Restraint Equipment Components and Method for Manufacturing the Same" and granted on Jan. 1, 2013; and U.S. Pat. No. 8,046,858, entitled "Gangway Handrail and Method for Manufacturing the Same" and granted on Nov. 1, 2011, the entire of disclosure of each of which is hereby incorporated by reference as if set forth verbatim herein and relied upon for all purposes.

FIG. 1 illustrates fall restraint equipment comprising a stairwell 100, a platform 102, a gangway 104, and a cage 106. In this example, platform 102 is part of a canopy system 108 comprising a canopy 110. Stairwell 100 is connected to and provides access to platform 102. Gangway 104 is pivotally connected to platform 102 on one side of the gangway and to cage 106 on the other. It should be understood that the fall restraint equipment illustrated in FIG. 1 may include other components, such as handrails 112.

In operation, the fall restraint equipment is located adjacent to railroad tracks, thereby allowing railcars, such as railcar 114, to pass by and be positioned adjacent the fall restraint equipment in order to unload the material from the railcar. In this manner, a locomotive operatively connected to railcar 114 positions the railcar in a manner such that an access point 116 of the railcar is directly in front of gangway 104. Gangway 104 is then pivoted or lowered toward railcar 114 until cage 106 encircles access point 116 as should be understood by those in the art. Access point 116 may include a platform 118 and its own guardrails 120.

After pivoting and lowering gangway 104 so that cage 106 encircles the area defined by access point 116, platform 118, and guardrails 120, a user reaches the access point by crossing gangway 104. After opening access point 116, the materials contained within railcar 114 may be unloaded and transported back down gangway 104, platform 102, and stairwell 100, if desired. Canopy system 108 and canopy 110 shields the user from the elements, such as precipitation or heat from the sun.

Figure 2:
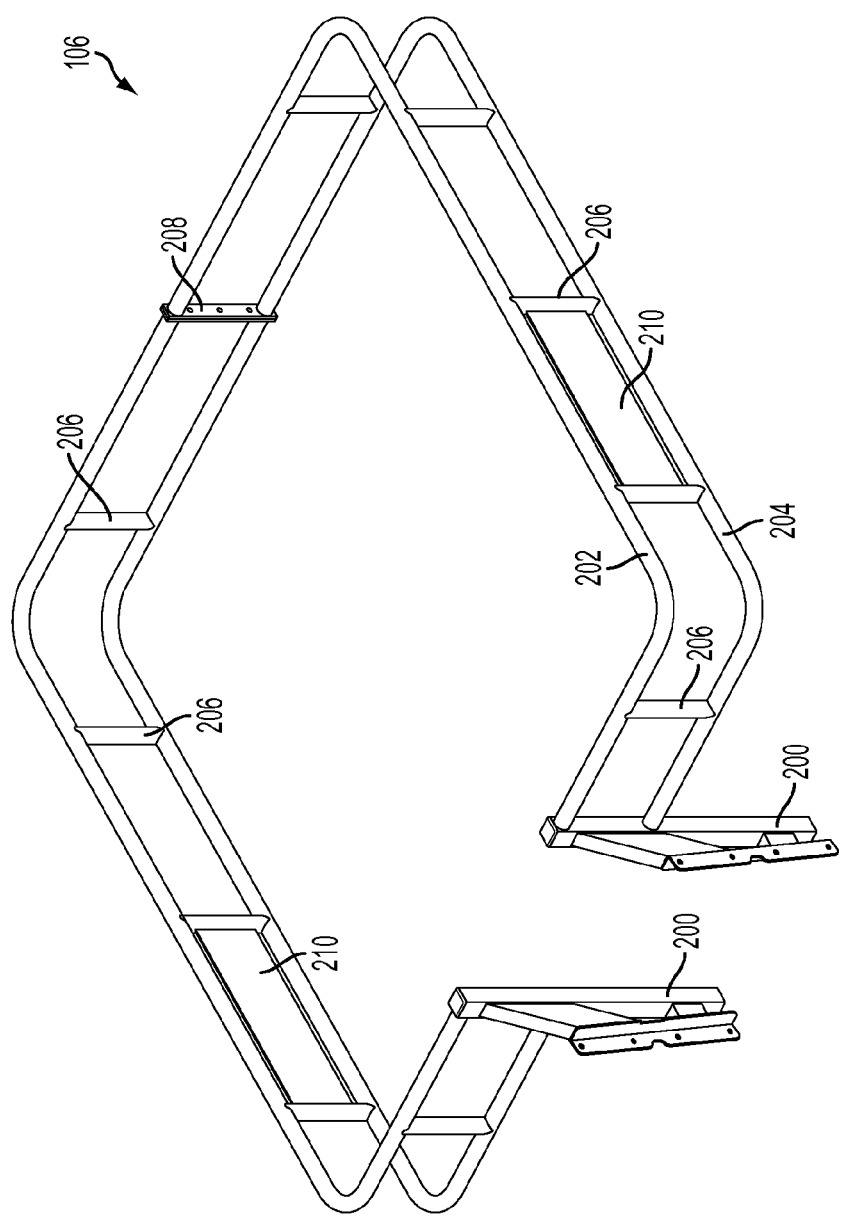
FIG. 2 is a perspective view of a cage of the fall restraint equipment of FIG. 1.

FIG. 2 is a perspective view of cage 106 comprising a top rail 202 connected to a bottom rail 204 via vertical supports 206. Top rail 202 and bottom rail 204 are comprised of two upper mirror image rail portions and two lower mirror image rail portions, respectively. The two mirror image rail portions are interconnected by a pair of splice plates 208. Cage 106 further comprises bumpout weldments 200 that connect the cage to another structure such as gangway 104 (FIG. 1). Cage 106 may optionally include a sign plate 210 to which a label or other instructions may be attached.

Figure 3:
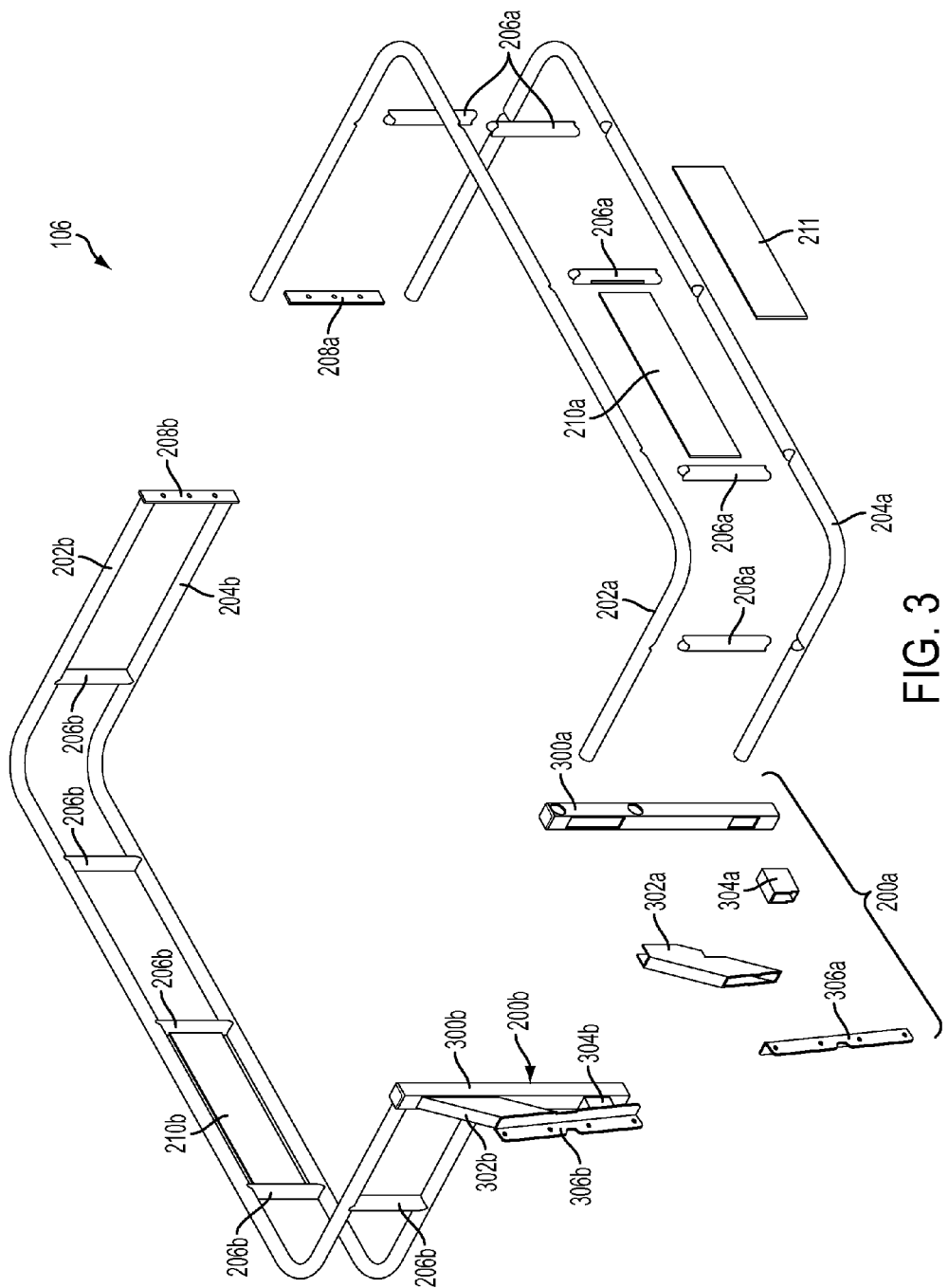
FIG. 3 is a partially exploded perspective view of the cage of FIG. 2.

FIG. 3 is a partially exploded perspective view of cage 106. Bumpout weldments 200a and 200b are mirror images of one another. Each of bumpout weldments 200 comprises a bump up component 300, a bump top brace 302, a bump bottom brace 304, and a bump angle plate 306. The formation of bumpout weldments 200 is described in more detail below. Bump angle plate 306 connects cage 106 and, more specifically, bumpout weldments 200, to another structure, such as gangway 104 (FIG. 1).

Figure 4:
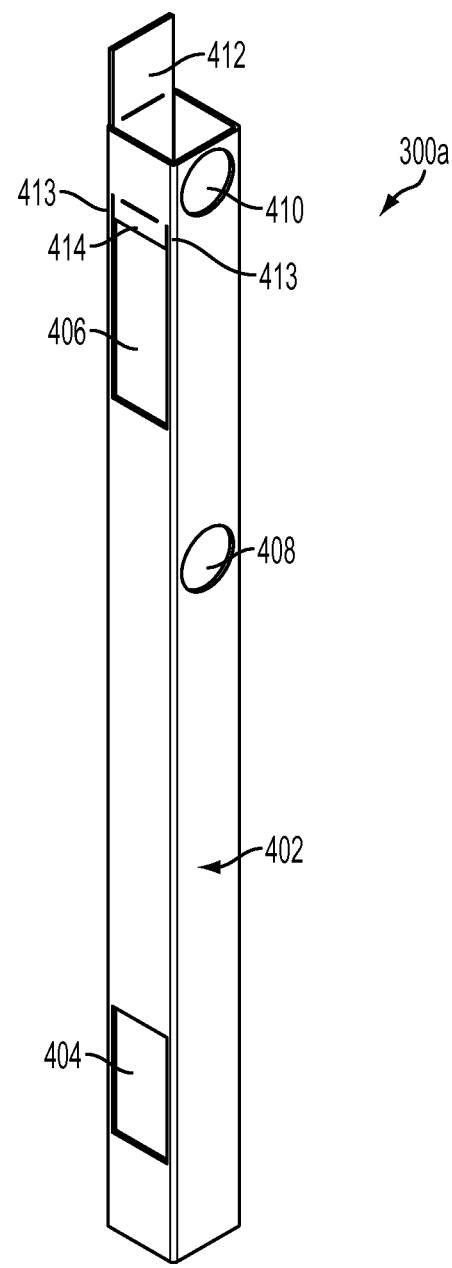
FIGS. 4, 5, 6, 7, and 8 are perspective views of various components of a cage bumpout weldment of the cage of FIG. 2.

FIG. 4 is a perspective view of bump up component 300a, which is formed from an integral, continuous piece 402 of tubular metal. The continuous piece 402 is drilled, lasered, or otherwise cut to define apertures 404, 406, 408, and 410 and tab 412. This may be accomplished through the use of a tube laser, cutting drill, or plasma torch. Continuous piece 402 is also cut at the areas denoted at 413 in order to define tab 414.

Figure 5:
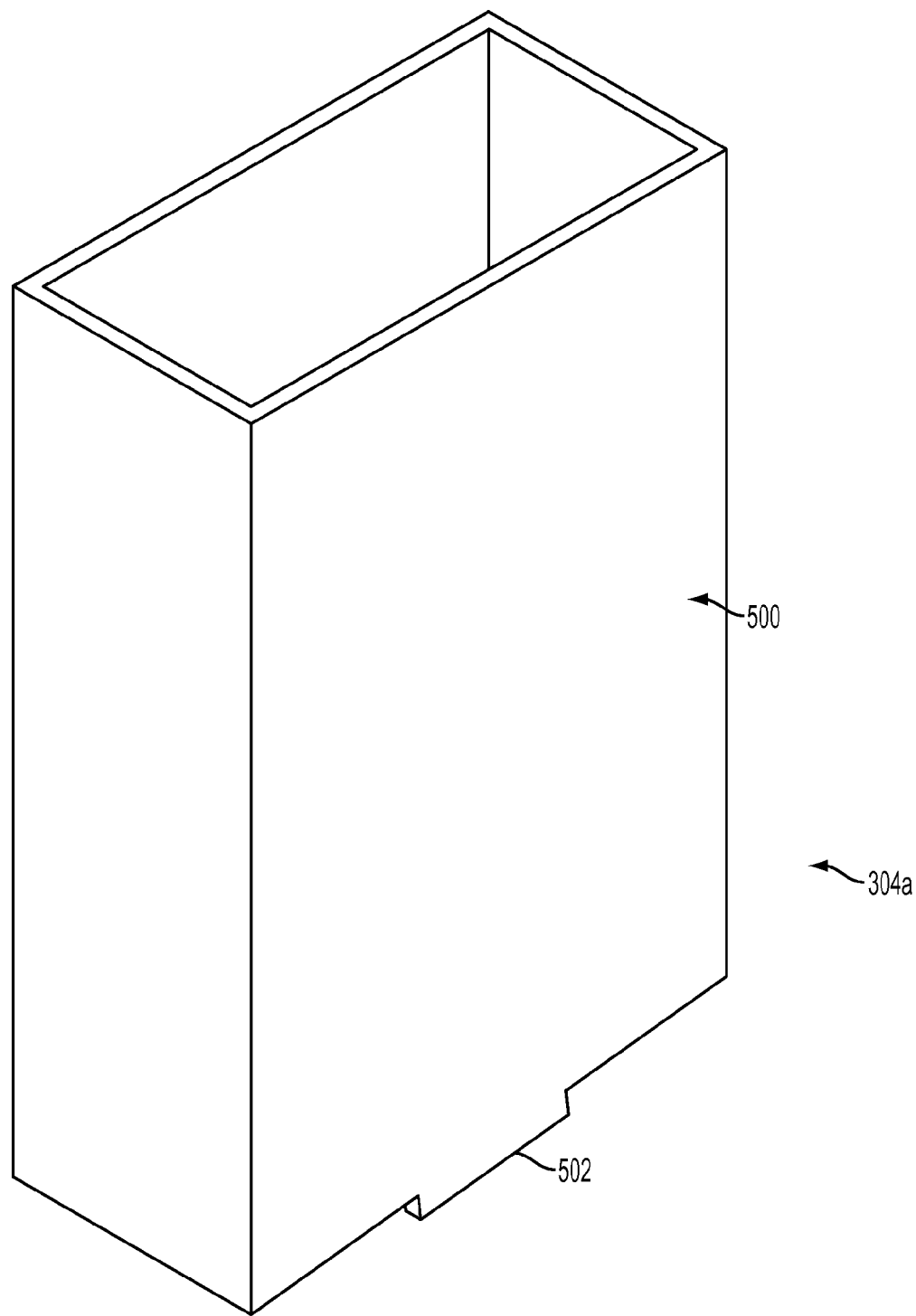

FIG. 5 is a perspective view of bump bottom brace 304a, which is formed from an integral, continuous piece 500 of tubular metal. Continuous piece 500 is drilled, lasered, or otherwise cut to define a pair of tabs 502. This may be accomplished through the use of a tube laser, cutting drill, or plasma torch. Each tab 502 is identical to the other tab and located on opposite sides of one end of the bump bottom brace 304a with respect to one another.

Figure 6:
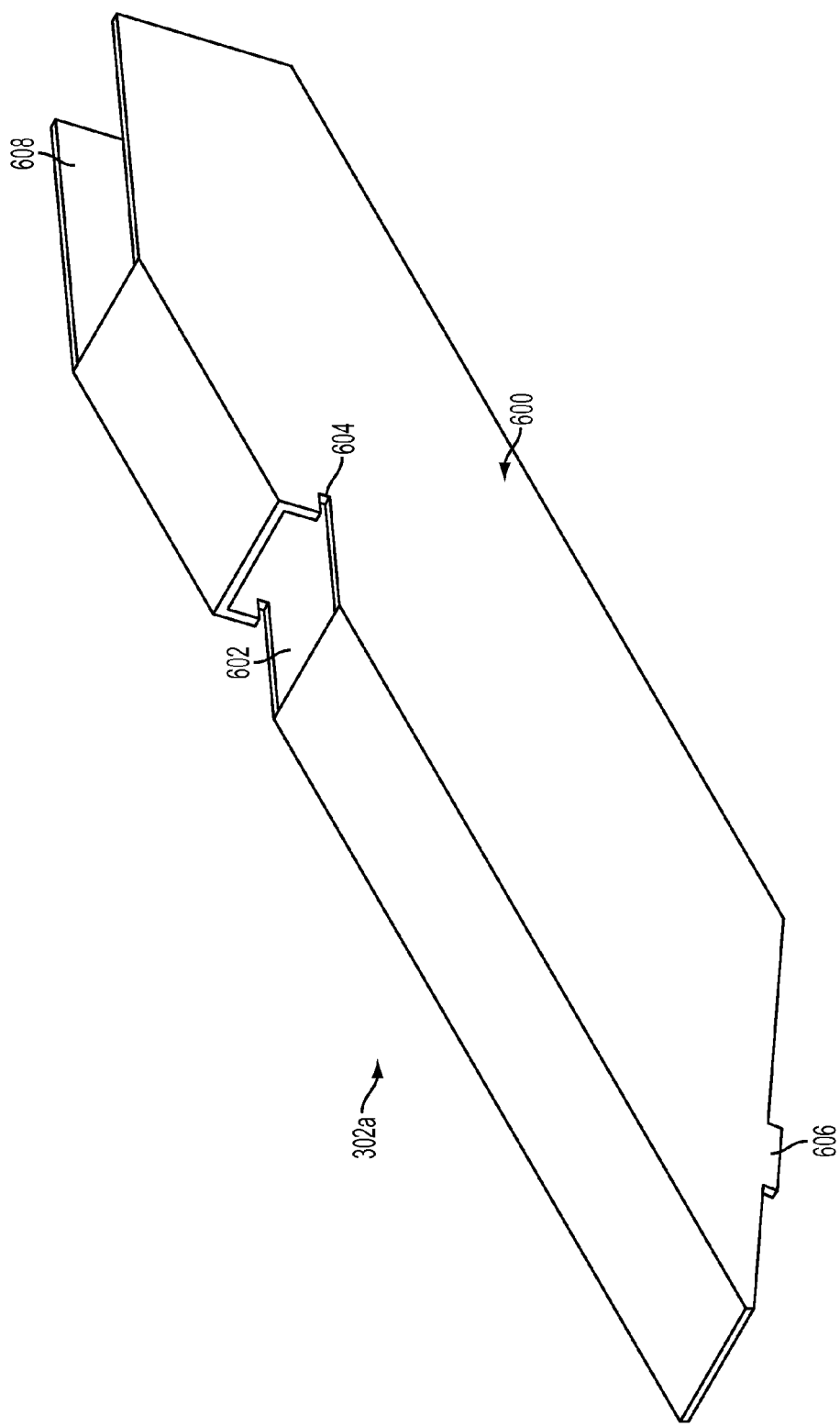

FIG. 6 is a perspective view of bump top brace 302a, which is also formed from an integral, continuous piece 600 of tubular metal. Continuous piece 600 is drilled, lasered, or otherwise cut to define tab aperture 602 (including the indentation denoted at 604), a pair of tabs 606, and area 608. This may be accomplished through the use of a tube laser, cutting drill, or plasma torch. Each tab 606 is identical to the other tab and located on opposites sides of one end of the bump top brace 302a.

Figure 7:
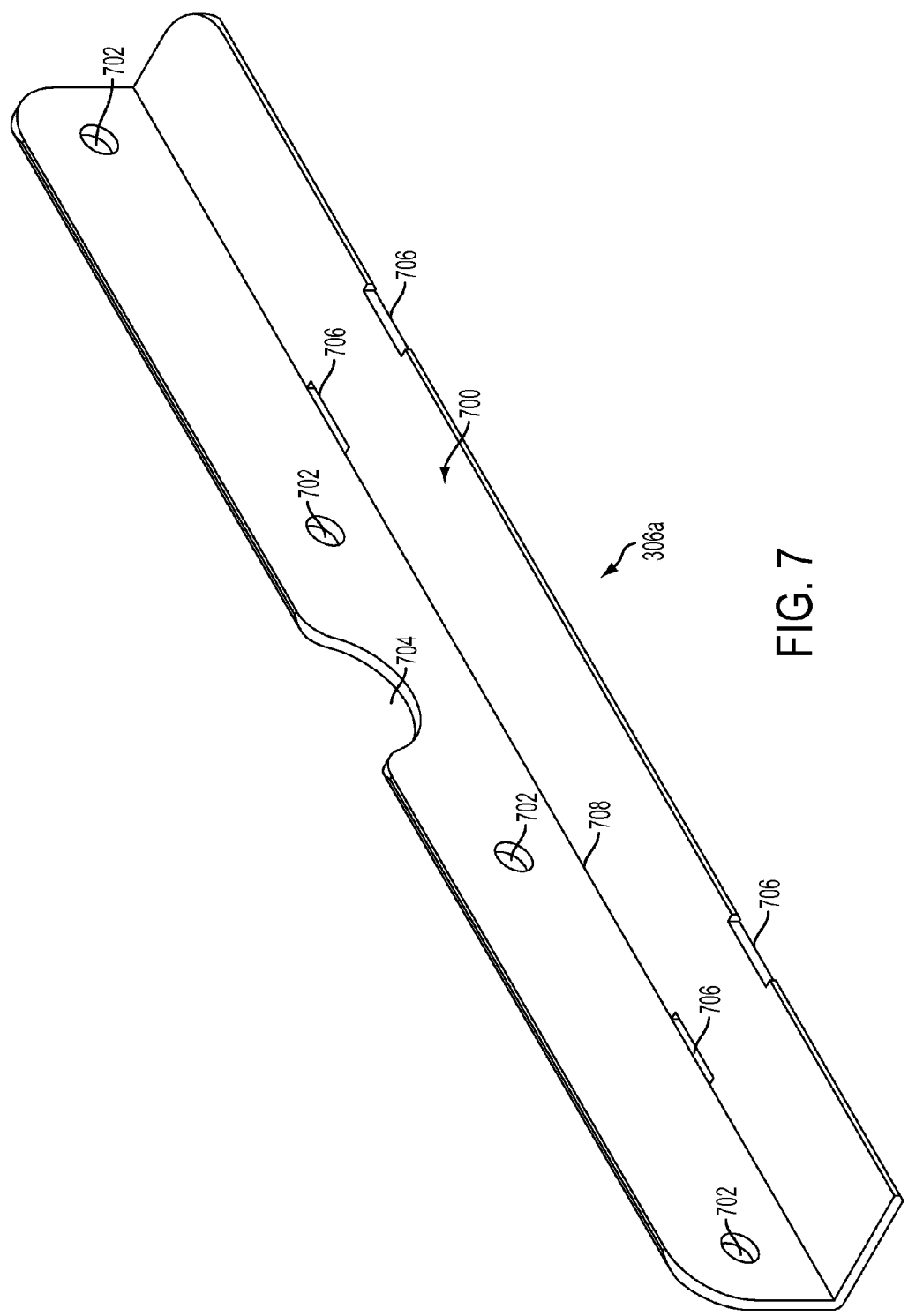
Figure 8:
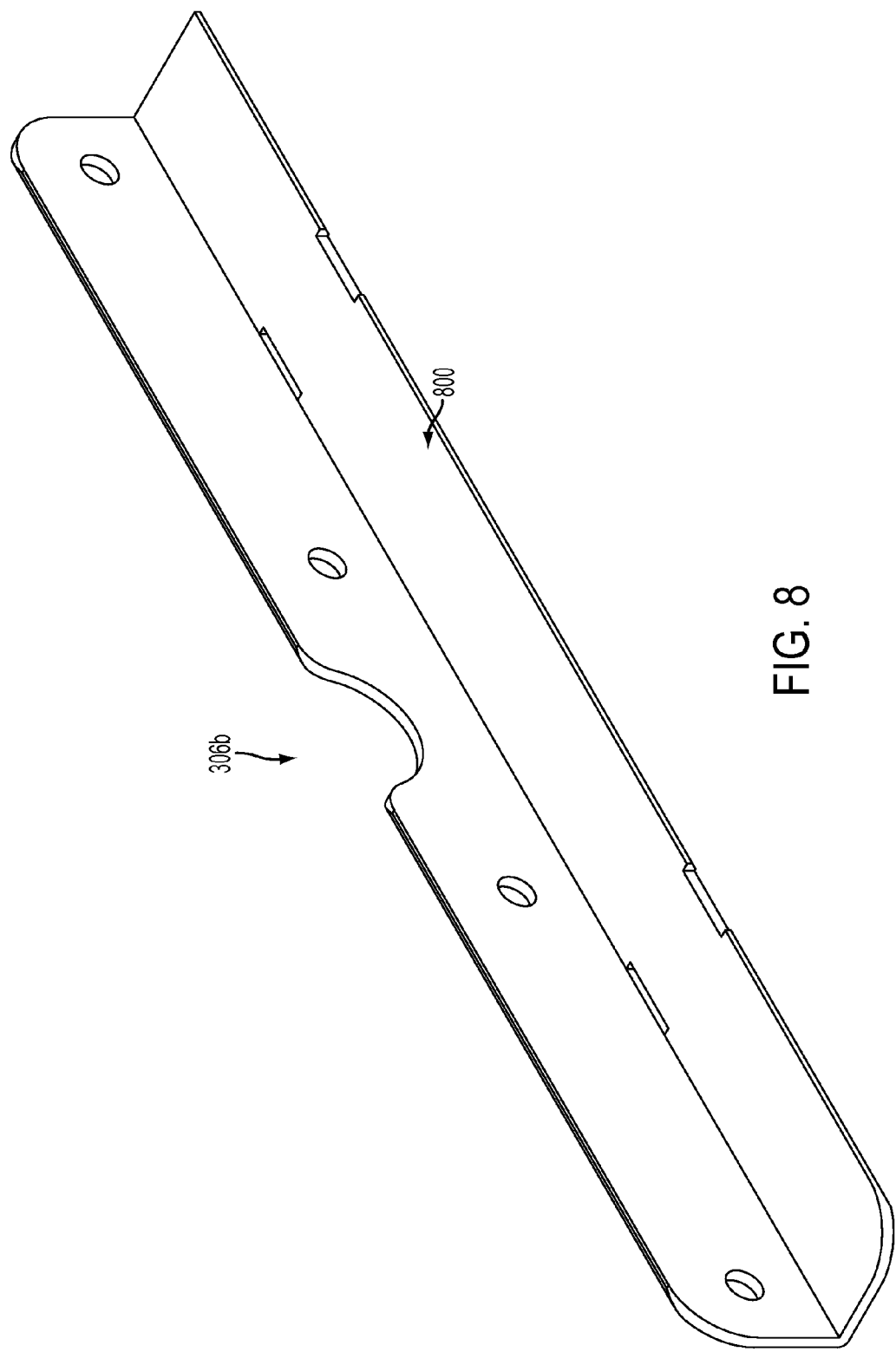

FIGS. 7 and 8 are perspective views of bump angle braces 306a and 306b, respectively, which are formed from respective continuous pieces 700 and 800 of sheet metal. Bump angle braces 306a and 306b are mirror images of one another. Accordingly, the following discussion is directed to bump angle brace 306a, although it should be understood to apply to bump angle brace 306b as well. Continuous piece 700 is drilled, lasered, or otherwise cut to define apertures 702, area 704, and indentations 706. Continuous piece 700 of sheet metal is folded along fold line 708 in order to form bump angle brace 302a.

Figure 9:
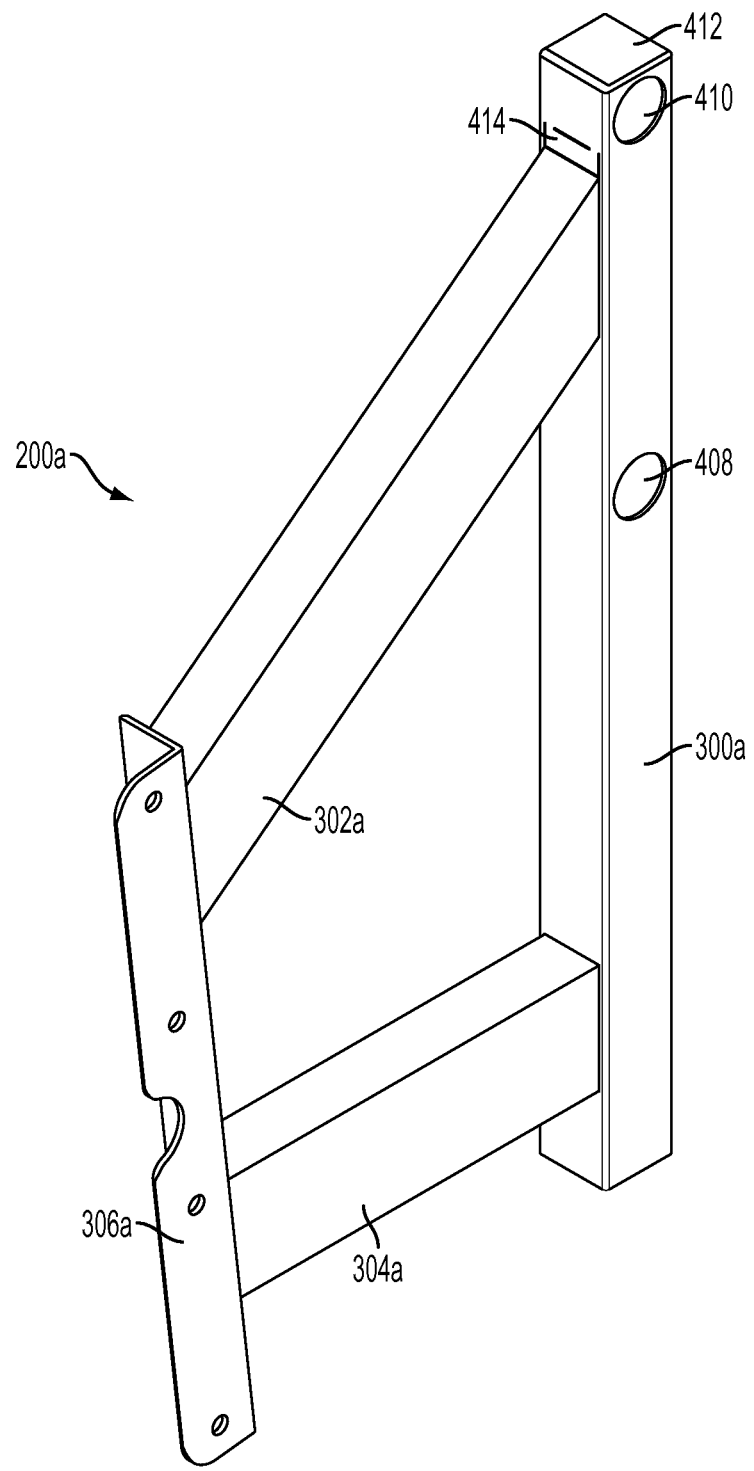
FIGS. 9 and 10 are perspective views of bumpout weldments of the cage of FIG. 2.
Figure 10:
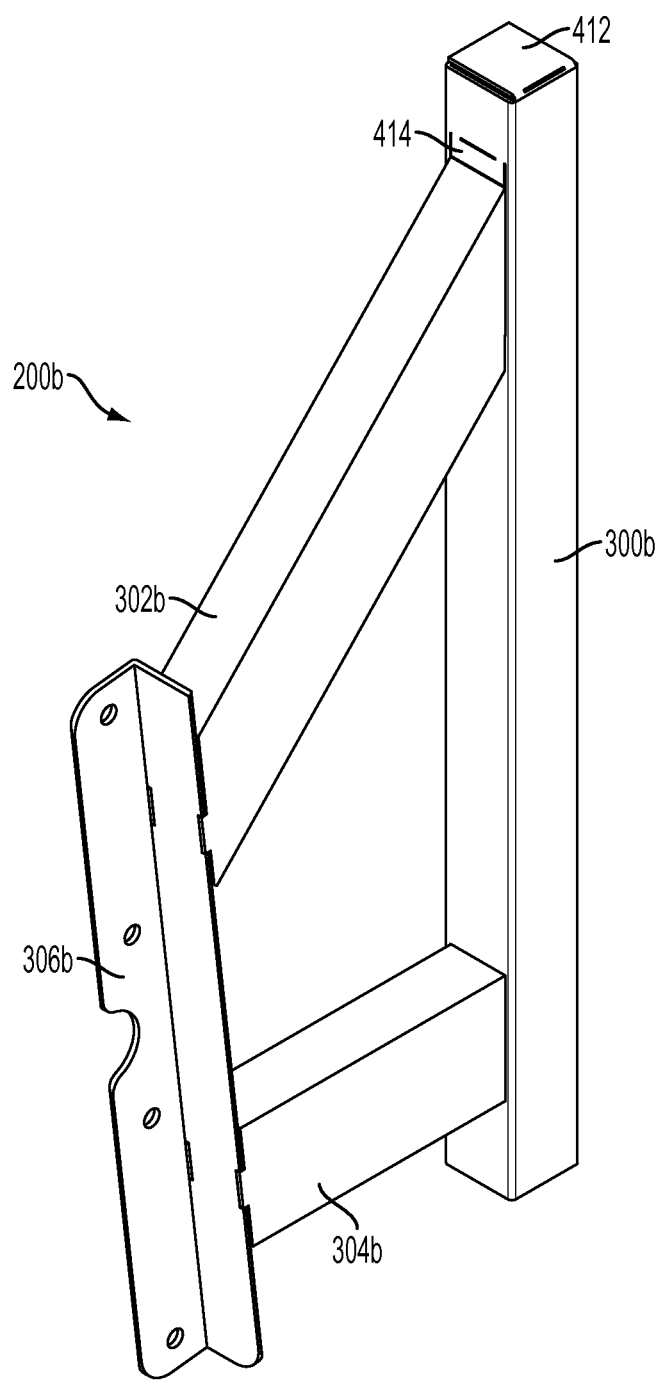

FIGS. 9 and 10 are perspective views of bumpout weldments 200a and 200b, respectively, which are mirror images of one another. Accordingly, the following discussion is directed to bumpout weldment 200a, although it should be understood to apply to bumpout weldment 200b. Referring to FIGS. 3, 4, 5, 6, 7, and 9, bumpout weldment 200b is formed by bending tab 414 outward (in the direction opposite of aperture 410). This provides a sufficient amount of clearance so that area 608 may be inserted into aperture 406. Pressure is then applied to bump up component 300a and bump top brace 302a so that the bottom edge of the area defining aperture 406 is received into area 604. Pressure is then applied to bump up component 300a and bump top brace 302a in order to lock the bump top brace into place with respect to component 300a. Pressure is also applied to tab 414 in order to push the tab back into contact with bump top brace 302a.

Tabs 606 of bump top brace 302a and tabs 502 of bump bottom brace 304a are inserted into corresponding apertures 706 of bump angle brace 306a. The opposite end of bump bottom brace 304a is inserted into aperture 404. The areas of components 300, 302, 304, and 306 that come into contact with one another are welded together for additional stability. It should be understood that the internal area defined by bump up component 300a receives respective portions of bump top brace 302a and of bump bottom brace 304a. Accordingly, the welds where these components come into contact with one another are not the only structural support holding bumpout weldments 300 together. Rather, the edges of bump up component 300 defining apertures 404 and 406 rest on the surfaces of bump bottom brace 304 and bump top brace 306, respectively, which have been inserted fully into component 300.

Figure 11:
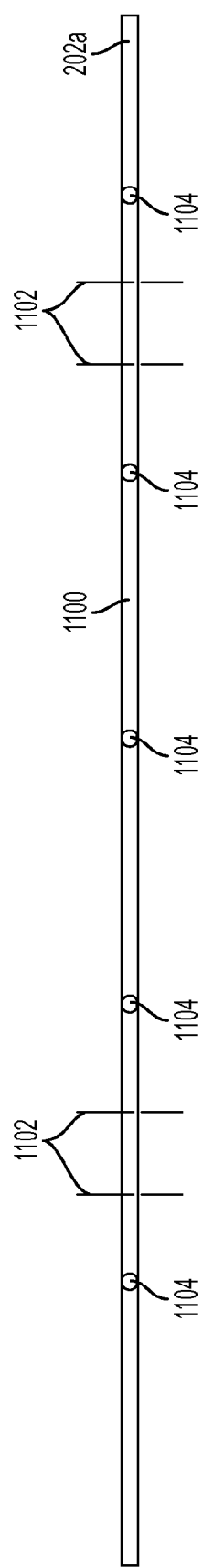
FIG. 11 is a bottom planar view of a top rail of the cage of FIG. 2.
Figure 12:
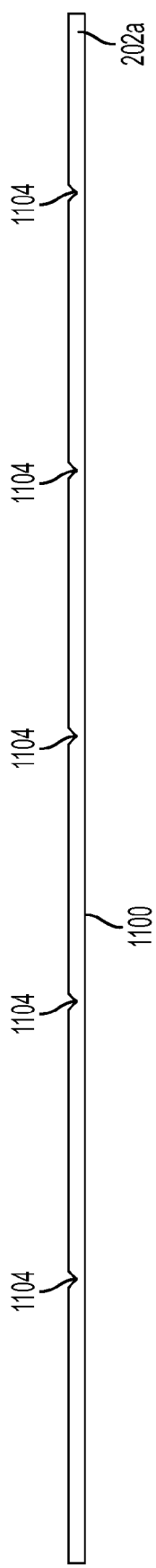
FIG. 12 is a side elevation view of the top rail of FIG. 11.
Figure 13:
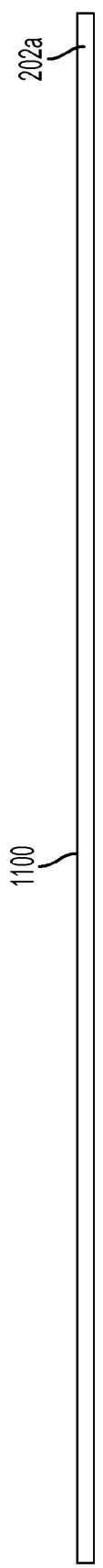
FIG. 13 is a top planar view of the top rail or FIG. 11.

FIG. 11 is a bottom planar view of portion 202a of top rail 202 (FIG. 2), which is formed from a continuous piece 1100 of circular, tubular metal. Continuous piece 1100 is drilled, lasered, or otherwise cut to define tab apertures 1104. This may be accomplished through the use of a tube laser, cutting drill, or plasma torch. Continuous piece 1100 of circular, tubular metal is then bent at approximately a 45° angle at the locations denoted by bend lines 1102 in order to form portion 202a of upper rail 202 (FIG. 2). FIGS. 12 and 13 are side elevation and top planar views, respectively, of portion 202a prior to being bent at bend lines 1102 (FIG. 11). It should be understood that bottom rail 204 is formed in a similar manner to that described above with respect to top rail 202.

Referring also to FIGS. 2 and 3, cage 106 is formed by inserting vertical supports bars 206 into the apertures defined by upper rail 202 and lower rail 204, such as apertures 1104. Opposite side ends of sign plate 210 may be inserted into a vertical aperture defined by two of the vertical supports bars 206 as illustrated in FIG. 3. Vertical support bars 206 are described in more detail below. A label 211 having an adhesive backing may be affixed to sign plate 210. It should be understood that the apertures defined by top rail 202 and bottom rail 204 are configured to receive a portion of each relevant vertical support bar 206. The connections between rails 202 and 204 and vertical support bars are then welded. It should be appreciated that the strength of the connection between these components is not based solely on a weld.

Once portions a and b of cage 106 have been formed in the manner described above, one end of rail portions 202a and 204a are welded to cage splice plate 208a. One end of rail portions 202b and 204b are likewise welded to cage splice plate 208b. Cage splice plates 208a and 208b are then welded together. The other end of rail portions 202a and 204a are inserted into bumpout weldment 200a. Specifically, the end of upper rail portion 202a is inserted into aperture 410 of bump up component 300a (FIGS. 4 and 9). The end of lower rail portion 204a is inserted into aperture 408 of bump up component 300a (FIGS. 4 and 9). The connections between the rails 202a and 204a and bump up component 300a are then welded. Upper rail portion 202b and lower rail portion 204b are similarly connected and welded to bumpout weldment 300b.

Figure 14:
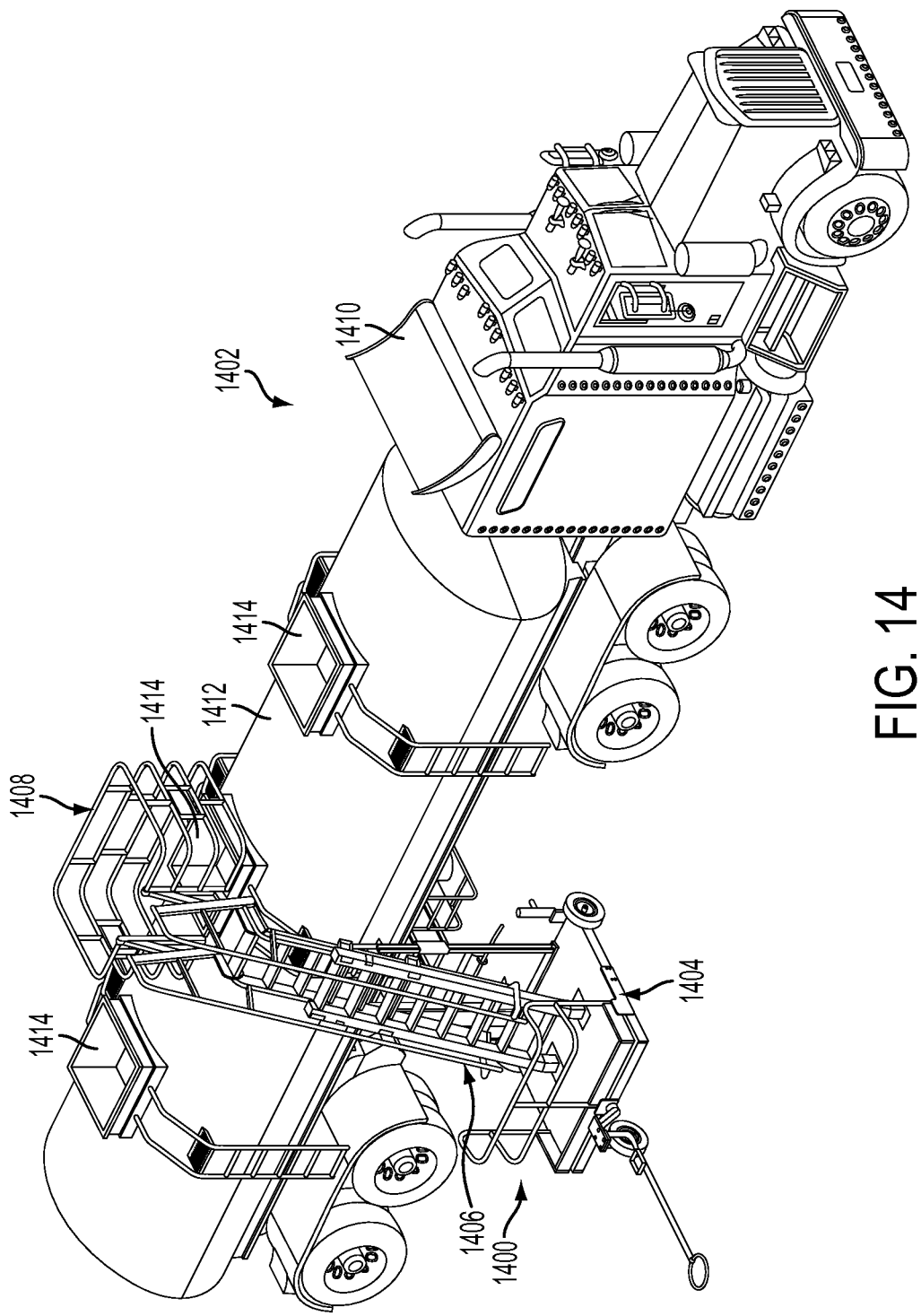
FIG. 14 is a perspective view of fall restraint equipment in accordance with an embodiment of the present invention.

FIG. 14 illustrates the use of fall restraint equipment to unload material from a tractor-trailer 1402. In this embodiment, the fall restraint equipment comprises a mobile access unit 1400 that includes a base portion 1404 and a ladder portion 1406. A cage 1408 is attached to the end of ladder portion 1406. Tractor-trailer 1402 comprises a tractor portion 1410 and a trailer portion 1412. Access points 1414 are located on the top surface of trailer portion 1412 similar to that described above with respect to railcar 114 of FIG. 1.

In operation, mobile access unit 1400 is positioned so that it is located adjacent an access point 1414 of trailer 1412. Cage 1408 is positioned to encircle the access point. A user climbs ladder portion 1406 in order to gain access to access point 1414.

Figure 15:
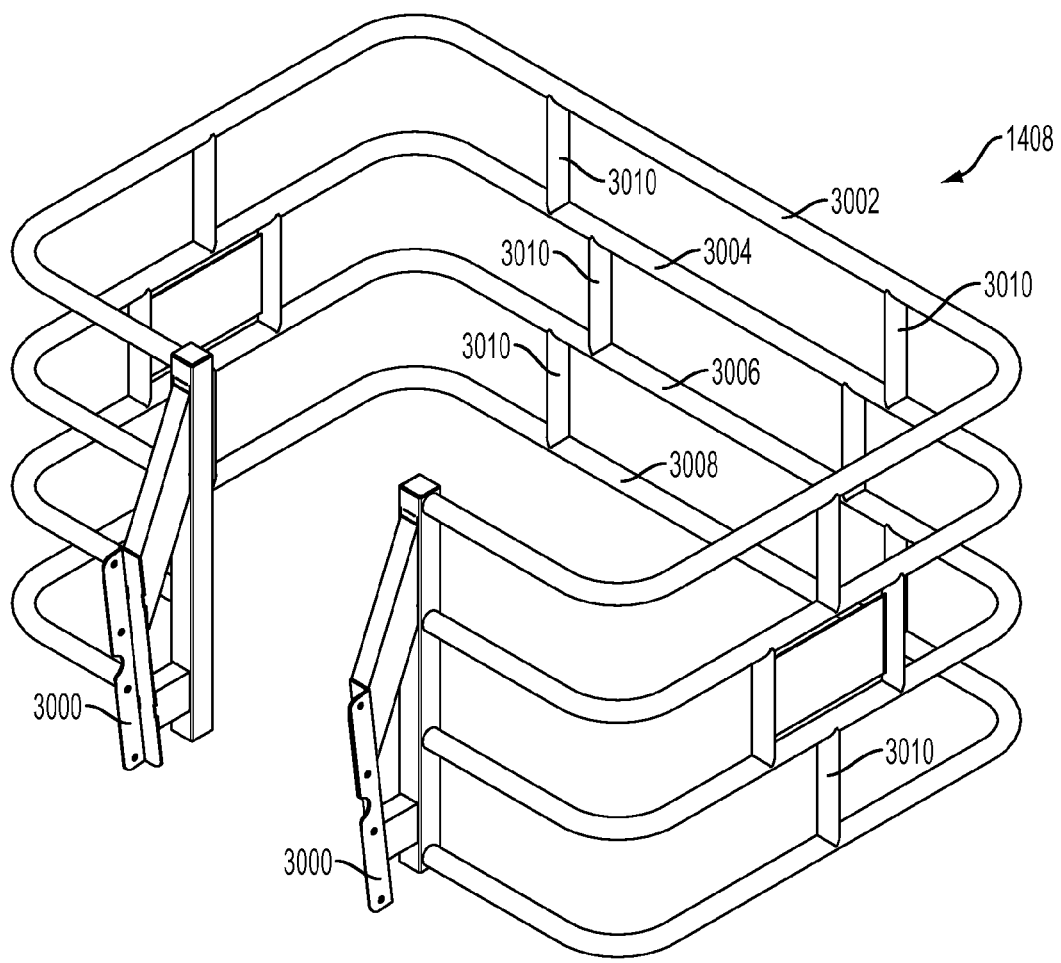
FIG. 15 is a perspective view of a cage of the fall restraint equipment of FIG. 14.

FIG. 15 is a perspective view of cage 1408 comprising an upper rail 3002, a first mid rail 3004, a second mid rail 3006, and a bottom rail 3008. Rails 3002, 3004, 3006, and 3008 are interconnected by vertical support bars 3010 in a manner similar to that described above with reference to FIGS. 2 and 3. Likewise, the end of rails 3002, 3004, 3006, and 3008 are connected to bumpout weldments 3000.

Figure 16:
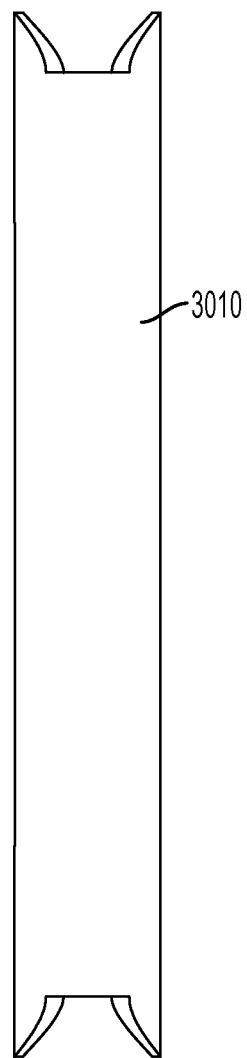
FIG. 16 is a perspective view of a vertical support tube of the cage of FIG. 15.

FIG. 16 is a side elevation view of vertical support bar 3010, but may also be used as vertical support bar 206 (FIG. 2). Vertical support bar 3010 is formed from a continuous piece of circular, tubular metal. The continuous piece is drilled, lasered, or otherwise cut to cut the bar to size and to define the indentations on both ends of the bar. This may be accomplished through the use of a tube laser, cutting drill, or plasma torch.

Figure 17:
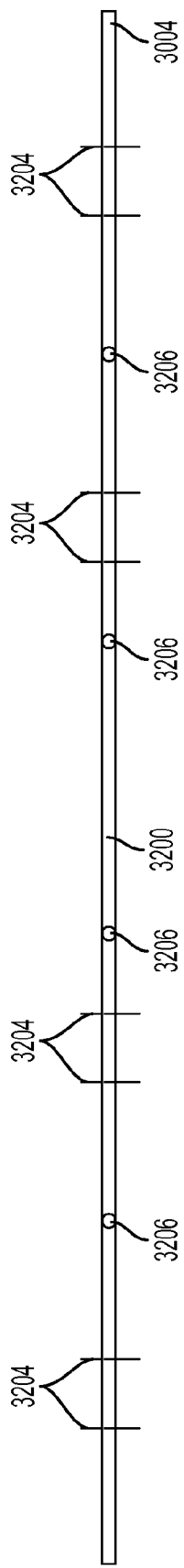
FIG. 17 is a top planar view of a rail of the cage of FIG. 15.
Figure 18:
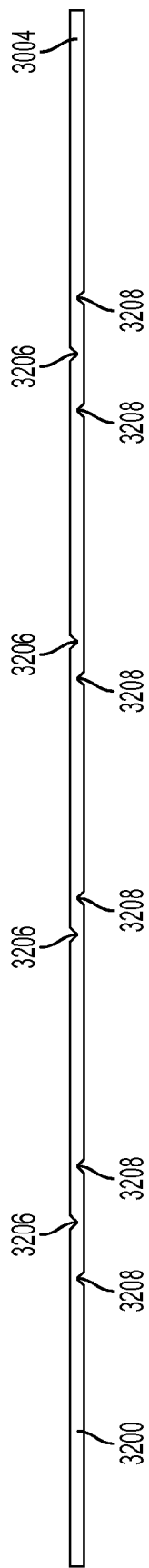
FIG. 18 is a side elevation view of the rail of FIG. 17.
Figure 19:
FIG. 19 is a bottom planar view of the rail of FIG. 17.

FIGS. 17, 18, and 19 are bottom planar, side elevation, and top planar views, respectively, of first mid rail 3004, which is formed from a continuous piece 3200 of circular, tubular metal. Continuous piece 3200 is drilled, lasered, or otherwise cut to cut the bar to define apertures 3206 and 3208. This may be accomplished through the use of a tube laser, cutting drill, or plasma torch. Continuous piece 3200 of circular, tubular metal is then bent at approximately 45° angles at bend lines commonly denoted at 3204 in FIG. 17 in order to form first mid rail 3004. Referring again to FIG. 15, upper rail 3002, second mid rail 3006, and bottom rail 3008 are formed in a similar manner to that described above with respect to FIGS. 17, 18, and 19, and with respect to FIGS. 2, 3, 11, 12, and 13. It should be understood, however, that the location of apertures 3206 and/or 3208 for each rail may vary in order to allow vertical support bars to be interspersed as illustrated in FIG.

15. Thus, it should be further understood that a surface of one rail defines apertures that correspond to apertures defined by the surface of another rail that faces the first rail to allow a vertical support bar to connect the two.

Figure 20:
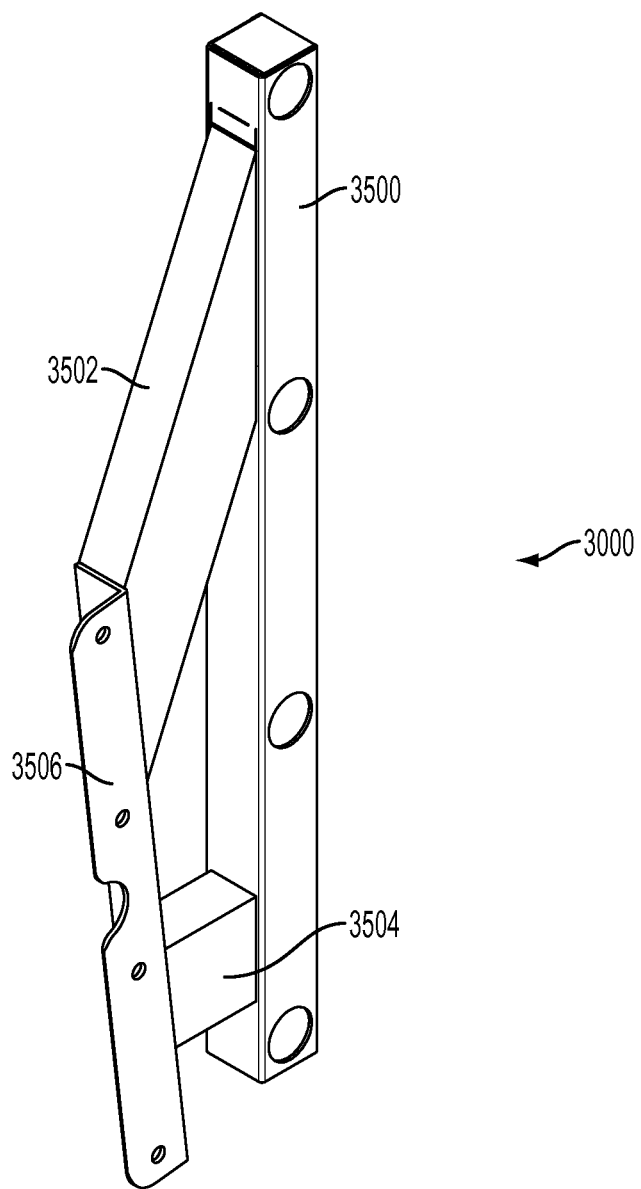
FIG. 20 is a perspective view of a bumpout weldment of the cage of FIG. 15.

FIG. 20 is a perspective view of bumpout weldment 3000 formed in a similar manner to that described above with respect to FIG. 9 except incorporating a bump up component 3500. Otherwise, weldment 3000 is similar in construction, operation, and use as that of weldment 200.

Figure 21:
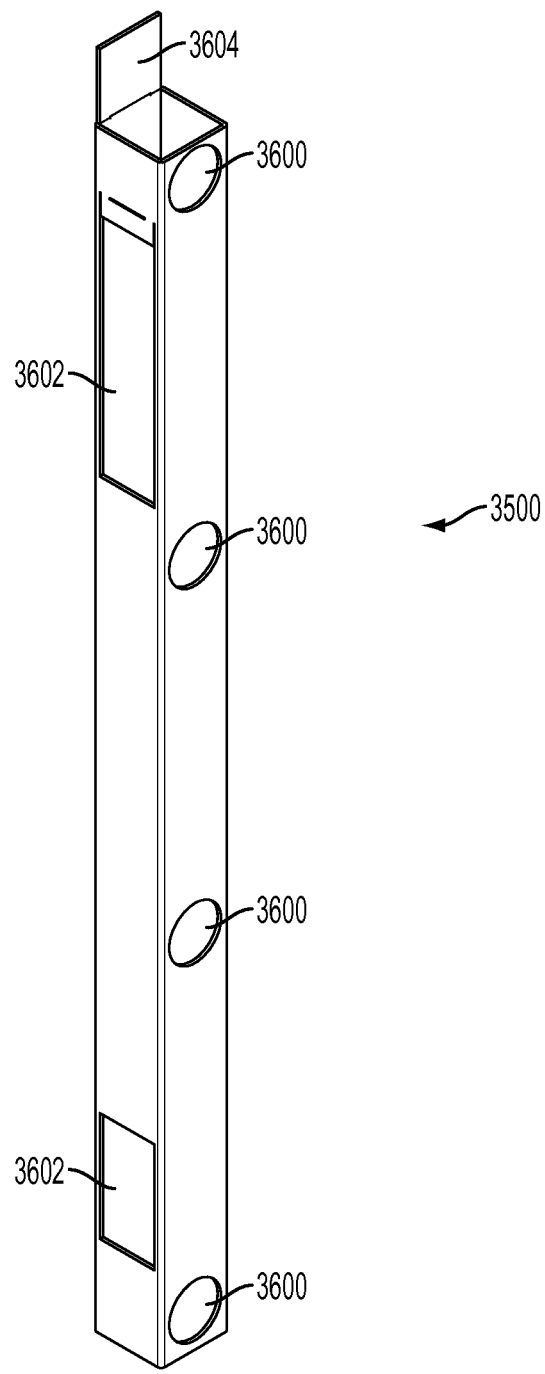
FIG. 21 is a perspective view of the bumpout weldment upright of FIG. 20.

FIG. 21 is a perspective view of bump up component 3500 comprising a continuous piece of tubular metal. The continuous piece is drilled, lasered, or otherwise cut to cut the bar to define apertures 3600 and 3602 and a tab 3604 in a manner similar to that described above with respect to FIG. 4. It should be understood, however, that component 3500 comprises four apertures 3600 in order to receive each of the rails described above.

It should be understood that the above description discloses a cage for fall restraint equipment that has increased stability at the locations where its components connect and is more efficient to manufacture.

Figure 22:
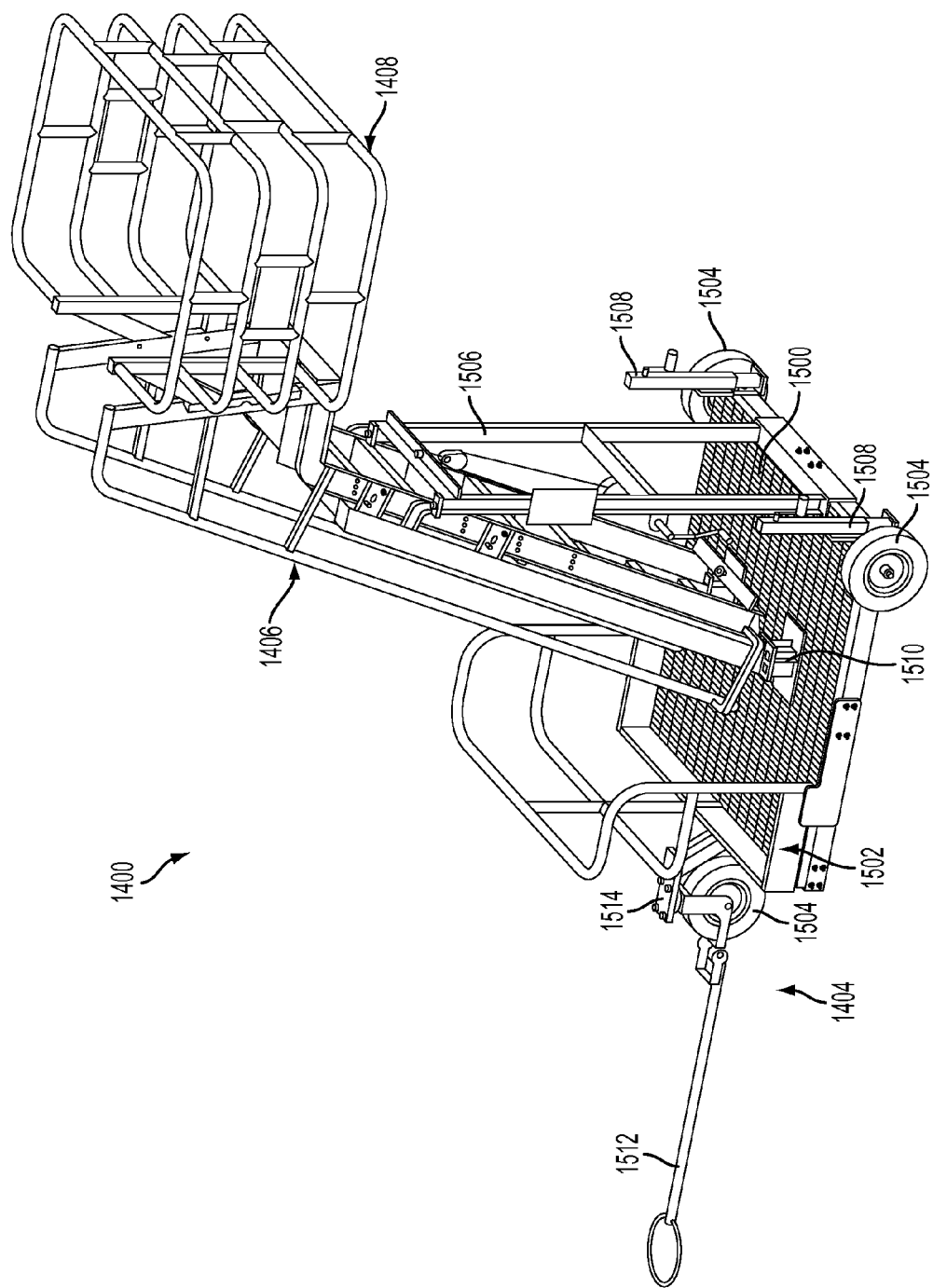
FIG. 22 is a perspective view of a mobile access unit and attached cage of the fall restraint equipment of FIG. 14.
Figure 23:
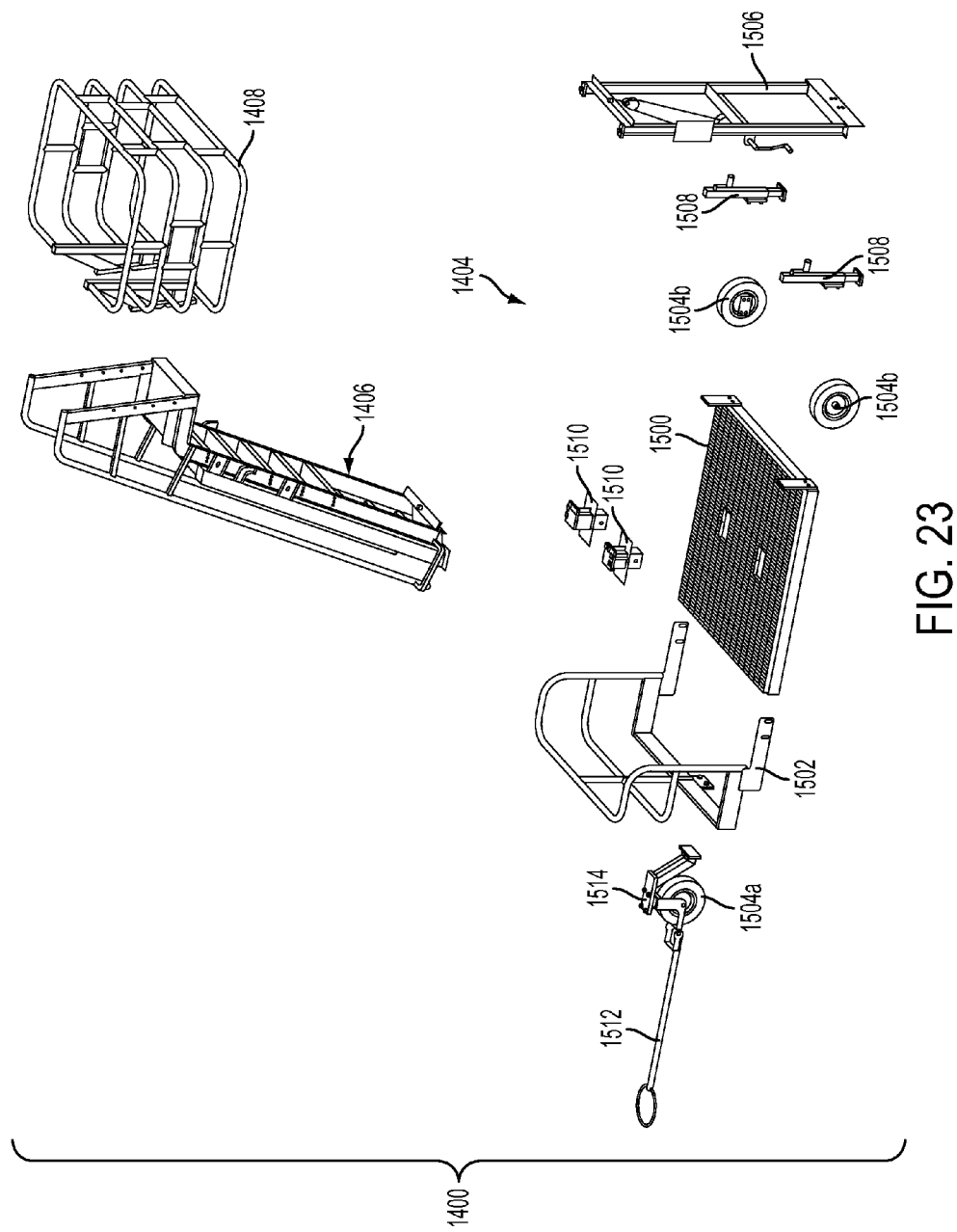
FIG. 23 is an exploded view of the mobile access unit and attached cage of FIG. 22.

FIG. 22 illustrates mobile access unit 1400 connected to cage 1408, both of FIG. 14, but removed from tractor-trailer 1402 (FIG. 14). FIG. 23 is an exploded view of mobile access unit 1400 and cage 1408. The construction and operation of cage 1408 are described above and are, therefore, not described in more detail below.

Referring to FIGS. 22 and 23, mobile access unit 1400 comprises base portion 1404 connected to and supporting ladder assembly 1406. Base portion 1404 comprises a platform 1500, a chariot portion 1502, a plurality of wheels 1504, an h-frame 1506, a pair of jack stands 1508, a pair of ladder adapters 1510, a handle 1512, and a gooseneck weldment 1514.

Figure 24:
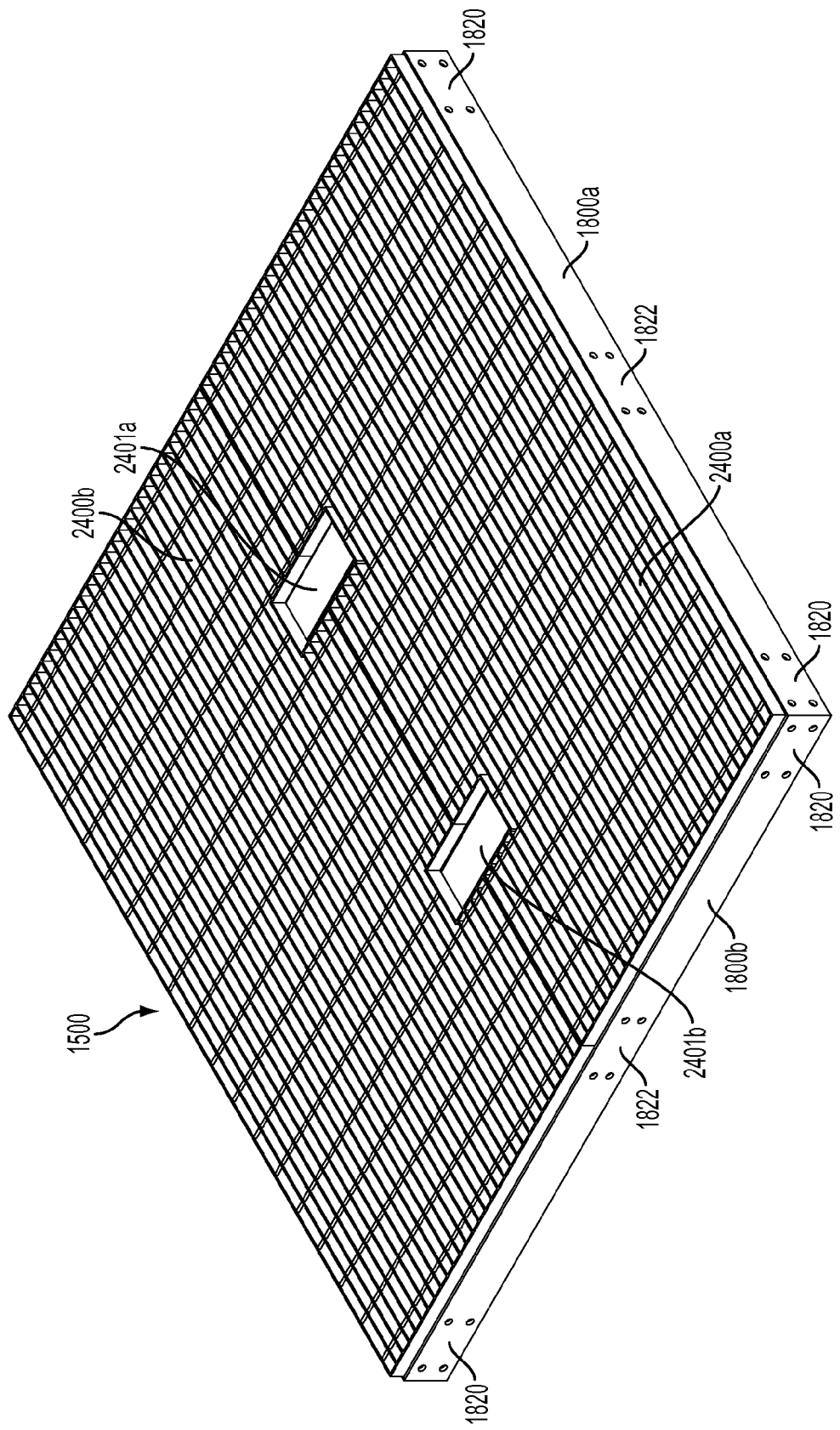
FIG. 24 is a perspective view of a base support of the mobile access unit of FIG. 22.
Figure 25:
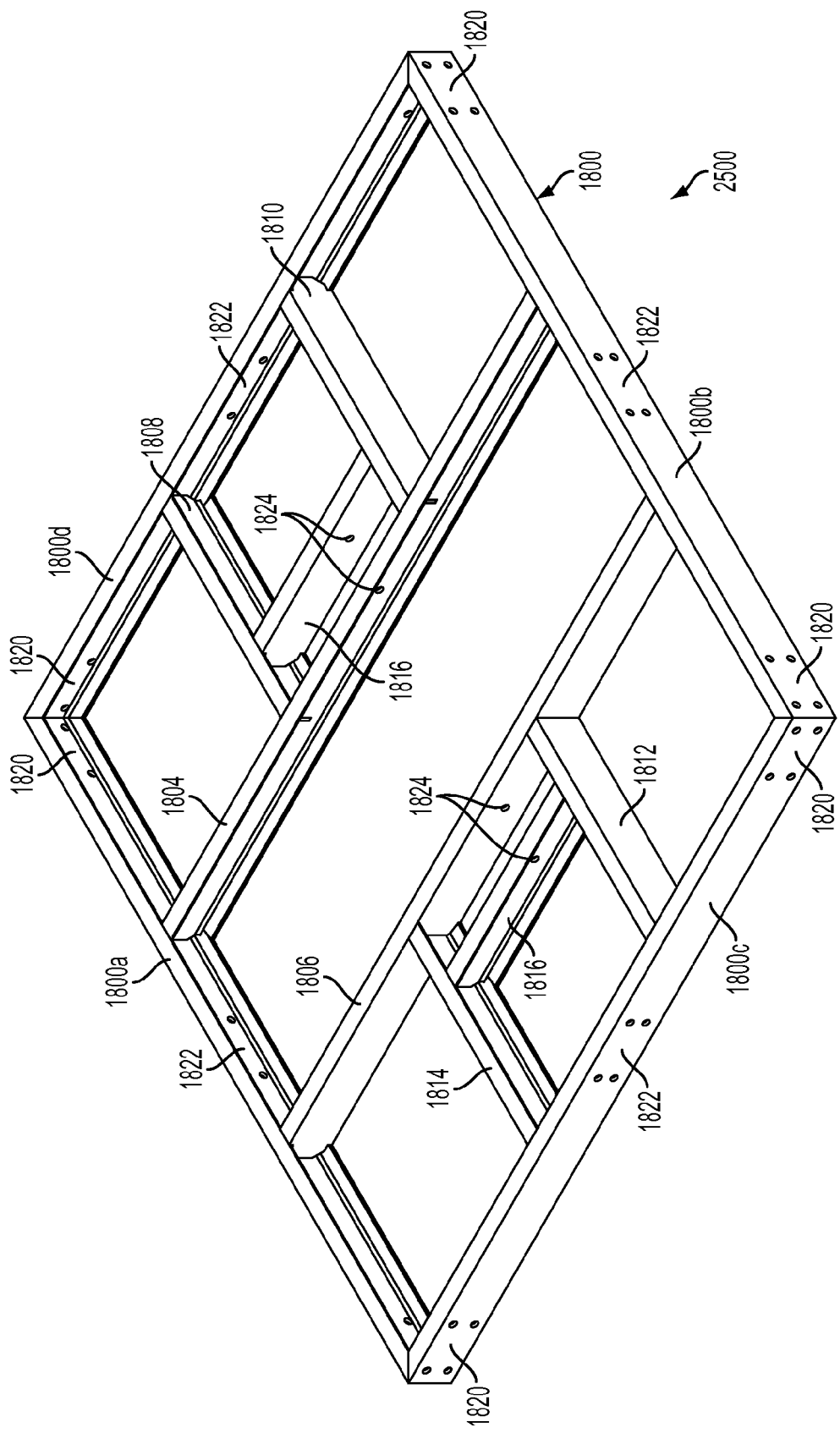
FIG. 25 is a perspective view of a support structure of the mobile access unit of FIG. 22.

FIG. 24 is a perspective view of a top surface of platform 1500. Platform 1500 comprises a side rail 1800 and two support surfaces 2400, both of which are described in more detail below. Support surfaces 2400 are preferably formed from continuous pieces of sheet metal that have been butterflied and/or lasered and stamped to result in surfaces 2400a and 2400b. Support surfaces 2400 are also cut in order to define apertures 2401 configured to receive ladder adapters, as described in more detail below. FIG. 25 is a perspective view of the underside of platform 1500 exhibiting a support structure 2500. Support surfaces 2400 have been removed from FIG. 25 for purposes of explanation.

Referring to FIG. 25, support structure 2500 comprises side rail 1800, a pair of crossbeams 1804 and 1806, a plurality of crossbeam supports 1808, 1810, 1812, and 1814, and adapter supports 1816. Side rail 1800 is a continuous piece of tubular metal that has been notched and folded at 90° in three places to form a rectangular support, as illustrated, in a manner similar to that described above with respect to top rail 202 (FIGS. 3, 11, and 12). Side rail 1800 is also lasered or otherwise cut to define apertures for receiving the ends of crossbeams 1804 and 1806 and crossbeam supports 1808, 1810, 1812, and 1814 that connect to the side rail. Side rail 1800 is also lasered or cut to define other apertures configured to receive bolts, rivets, or other suitable fasteners in order to connect to other components of base portion 1404 (FIG. 23), as described below. For simplicity, apertures defined near the corners of side rail 1800 are denoted by reference numerals 1820, while apertures defined near the middle of each section of the side rail are denoted by reference numerals 1822. The crossbeams are lasered or otherwise cut to define apertures for receiving the ends of the crossbeam supports that connect to the crossbeams. Likewise, the crossbeam supports are lasered or otherwise cut to define apertures for receiving the ends of adapter supports 1816. Preferably, the crossbeams, crossbeam supports, and adapter supports are each constructed from a singular piece of tubular metal.

Each end of one adapter support 1816 is inserted into crossbeam supports 1808 and 1810, while each end of the other adapter support is inserted into crossbeam supports 1812 and 1814. One end of each of crossbeam supports 1808 and 1810 is inserted into portion 1800d of the side rail, while the other end of each crossbeam support is inserted into crossbeam 1804. Likewise, one end of each of crossbeam supports 1812 and 1814 is inserted into portion 1800c of the side rail, while the other end of each crossbeam support is inserted into crossbeam 1806. Side rail 1800 is then folded at the corner between portion 1800b and 1800c and the corner between portion 1800b and 1800d so that one end of each of crossbeams 1804 and 1806 is inserted into portion 1800b of the side rail. Side rail is folded at the corner between portions 1800a and 1800d so that the other end of each of crossbeams 1804 and 1806 are inserted into the apertures defined in portion 1800a of the side rail and so that the end of portions 1800a and 1800c form a corner. The connections made between two components may then be welded for additional strength and support, such as the connections made by the crossbeams and the crossbeam supports. Support surfaces 2400 are fastened to support structure 2500 by any suitable method, such as welding, bolting, riveting, or a combination thereof.

Figure 26:
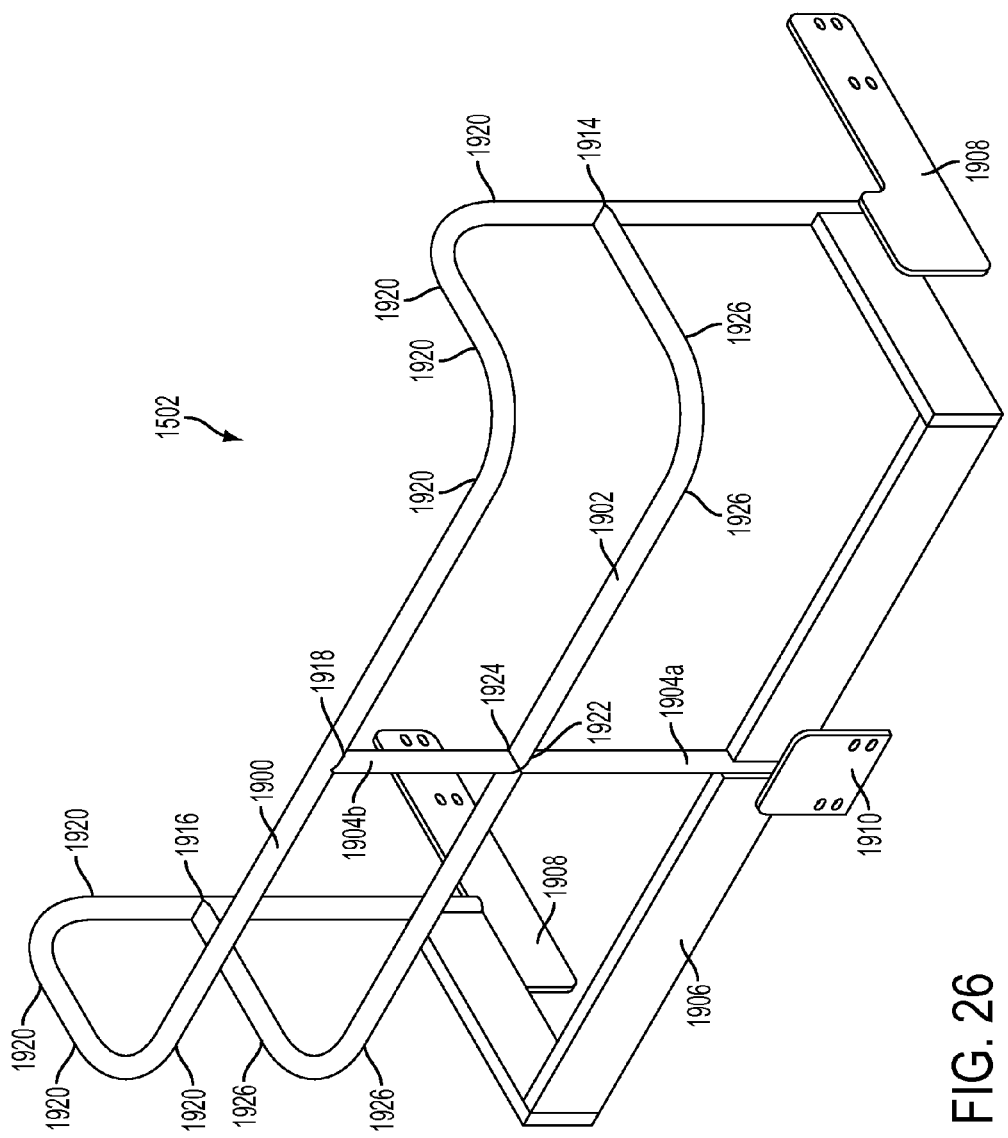
FIG. 26 is a perspective view of a handrail assembly of the mobile access unit of FIG. 22.

FIG. 26 is a perspective view of chariot portion 1502 of mobile access unit 1400 (FIG. 22) comprising a top rail 1900, a midrail 1902, a pair of midbeams 1904, a toeboard 1906, and brackets 1908 and 1910. Top rail 1900 and midrail 1902 are formed in a manner similar to that described above with respect to top rail 202 (FIGS. 3, 11, and 12). That is, rails 1900 and 1902 are formed from respective continuous pieces of circular, tubular metal, lasered or otherwise cut to define apertures to receive ends of other components, and curved at 45° angles at certain locations. For instance, top rail 1900 is lasered or otherwise cut to define apertures configured to receive both ends of midrail 1902 at opposite sides of the top rail denoted at points 1914 and 1916 and to define an aperture configured to receive an end of midbeam 1904b denoted at point 1918. Top rail 1900 is curved at a 45° at the locations denoted by numerals 1920. Midrail 1902 is lasered or otherwise cut to define apertures configured to receive midbeams 1904a and 1904b on opposite sides of the midrail as denoted at points 1922 and 1924, respectively. Midrail 1902 is curved at a 45° at the locations denoted by numerals 1926.

The portions of toeboard 1906 are formed from continuous pieces of tubular metal. In one embodiment, the ends of midbeam 1904a and top rail 1900 are lasered or otherwise cut to define areas to receive the portions of toeboard 1906. The portions of toeboard 1906 may also be connected to ends of midbeam 1904a and top rail 1900 by other suitable fastening methods, such as welding. Likewise, brackets 1908 and 1910 are fastened to toeboard 1906 by any suitable method, including welding, bolting, and/or riveting.

Figure 27:
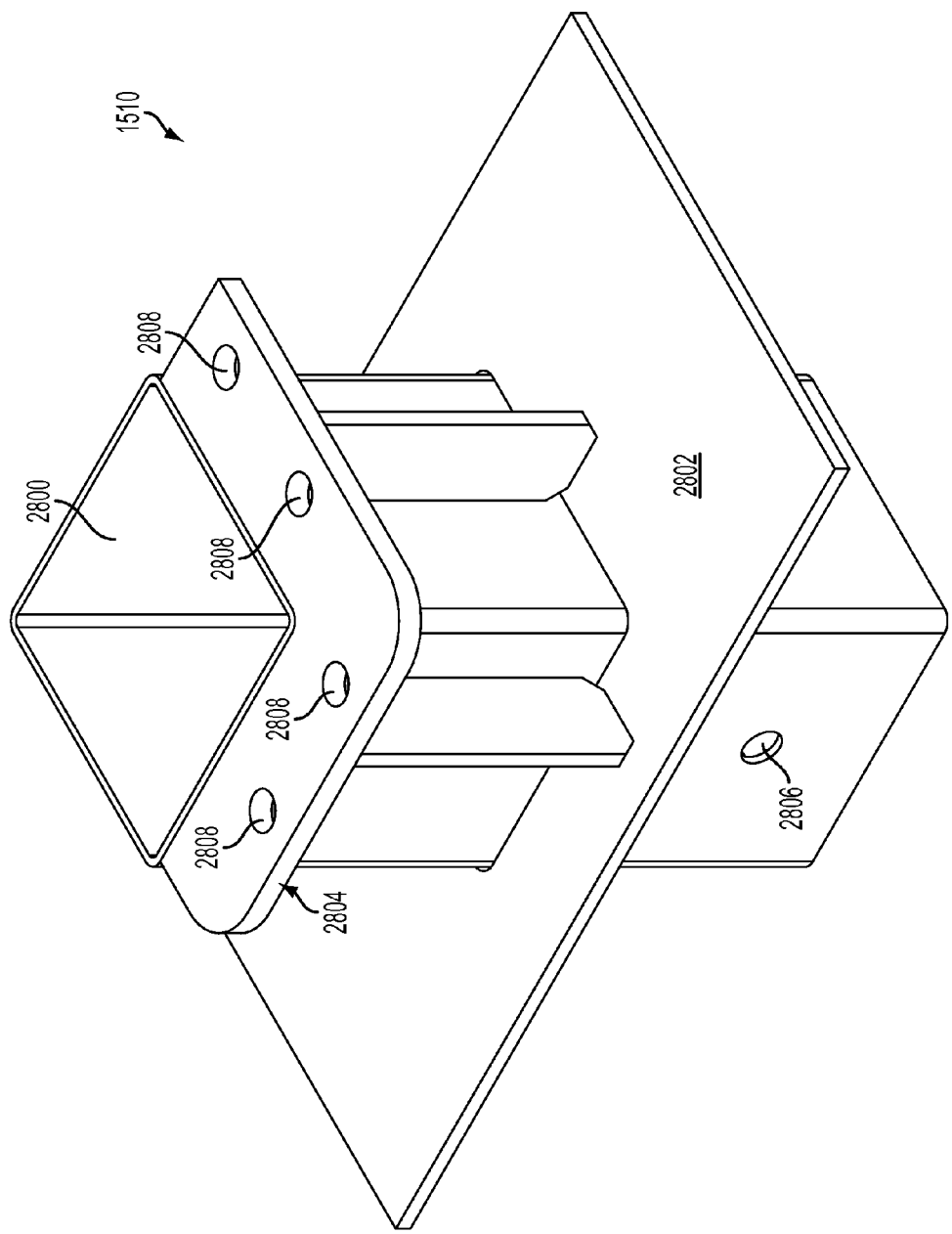
FIGS. 27 and 28 are perspective views of ladder adapters of the mobile access unit of FIG. 22.
Figure 28:
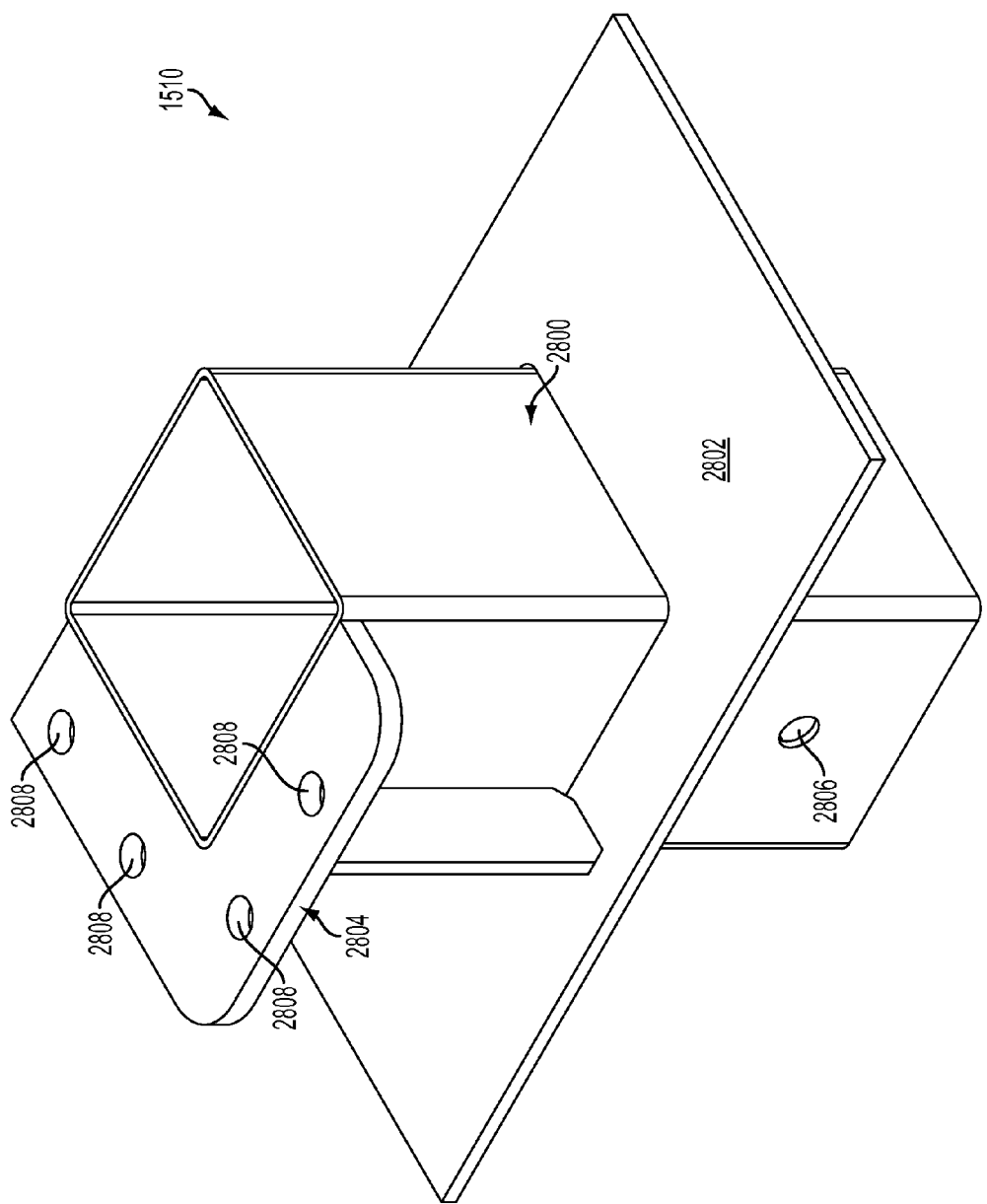

FIGS. 27 and 28 are perspective views of ladder adapters 1510 of base portion 1404 (FIGS. 22 and 23) in accordance with one embodiment of the present invention. Ladder adapters 1510 comprise a tubular portion 2800, a flat portion 2802, and a lip portion 2804. Tubular portion 2800 is formed from a continuous piece of tubular metal that has been lasered or otherwise cut to define a pair of opposing apertures 2806. Apertures 2806 of ladder adapters 1510 are configured to align with apertures 1824 defined by crossbeams 1804 and 1806 and ladder adapters 1816 (all of FIG. 25). Lip portion is lasered or otherwise cut to define apertures 2808, which are configured to align with apertures of ladder portion 1406 (FIGS. 22 and 23), as described in more detail below.

Figure 29A:
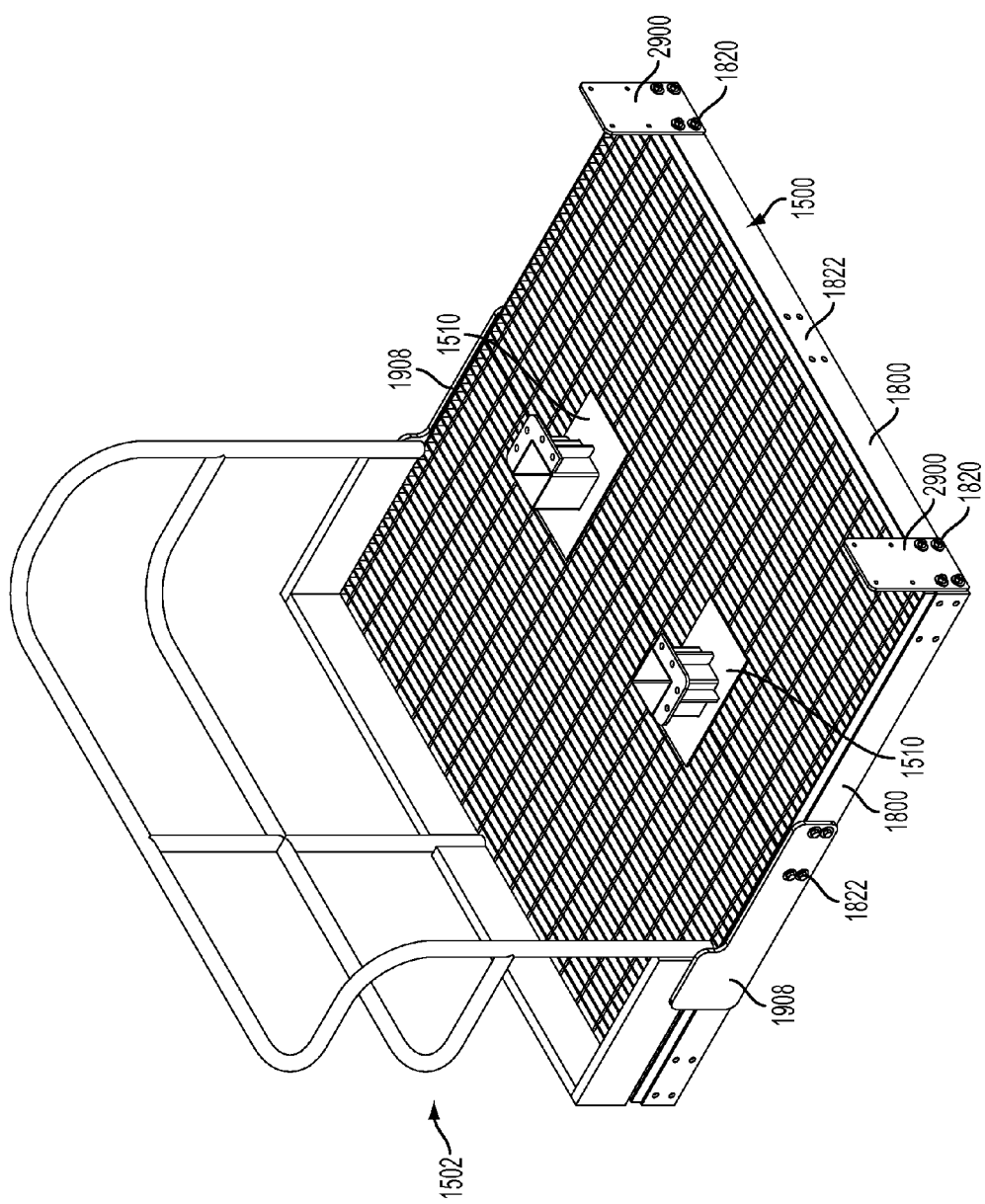
FIG. 29a is a perspective view of a base portion of the mobile access unit of FIG. 22.
Figure 29B:
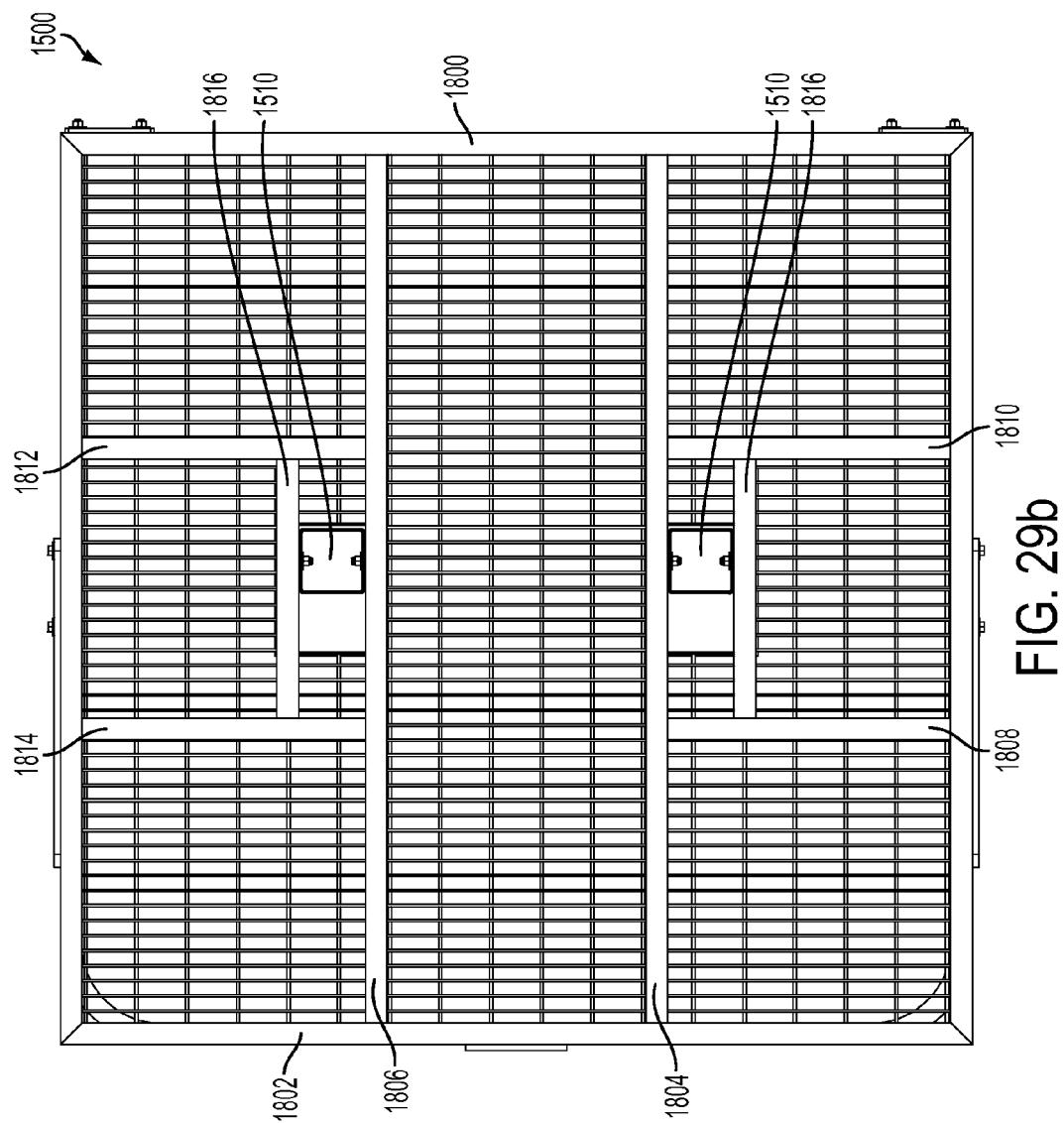

Referring to FIGS. 29a and 29b, chariot portion 1502 is connected to platform 1500 by bolts or other suitable fasteners connecting brackets 1908 to side rail 1800. An additional pair of brackets 2900 configured to connect to jack stands 1508 (FIGS. 22 and 23), as described below, are bolted or otherwise connected to platform 1500. Ladder adapters 1510 are bolted to respective crossbeams 1804 and 1806 and to adapter supports 1816.

Figure 30:
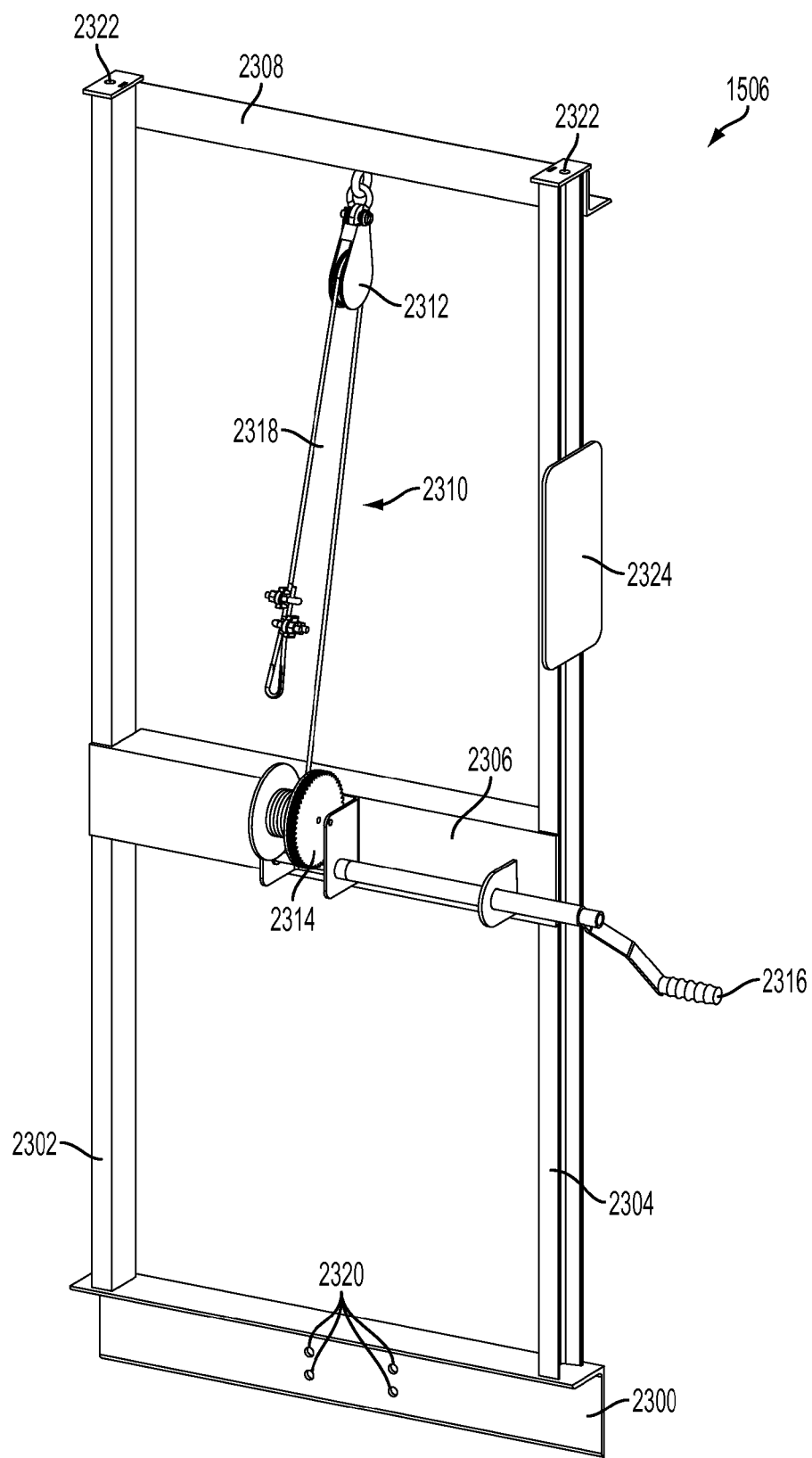
FIG. 30 is a perspective view of an h-frame assembly of the mobile access unit of FIG. 22.

FIG. 30 is a perspective view of an h-frame 1506 comprising a bottom support 2300, a pair of uprights 2302 and 2304, a midbeam 2306, and a top support 2308. A pulley system 2310 comprising a pulley 2312, a wench 2314, a crank 2316, and a cable 2318 is attached to top support 2308 and midbeam 2306. That is, pulley 2312 is connected to top support 2308, while wench 2314 and crank 2316 are connected to midbeam 2306. The operation and use of h-frame 1506 including pulley system 2310 is described in more detail below. Bottom support 2300 is cut to define a set of apertures denoted at 2320 that are used to connect h-frame 1506 to platform 1500 as described in more detail below. Each of uprights 2302 and 2304 is lasered or otherwise cut to define a set of apertures 2322 configured to align with apertures defined by uprights 2414 of ladder portion 1406 (described below with respect to FIG. 32) in order to connect h-frame 1506 to the ladder portion. H-frame 1506 may comprise additional components as desired, such as a sign placard 2324 to which a label or other information may be adhered.

Figure 31:
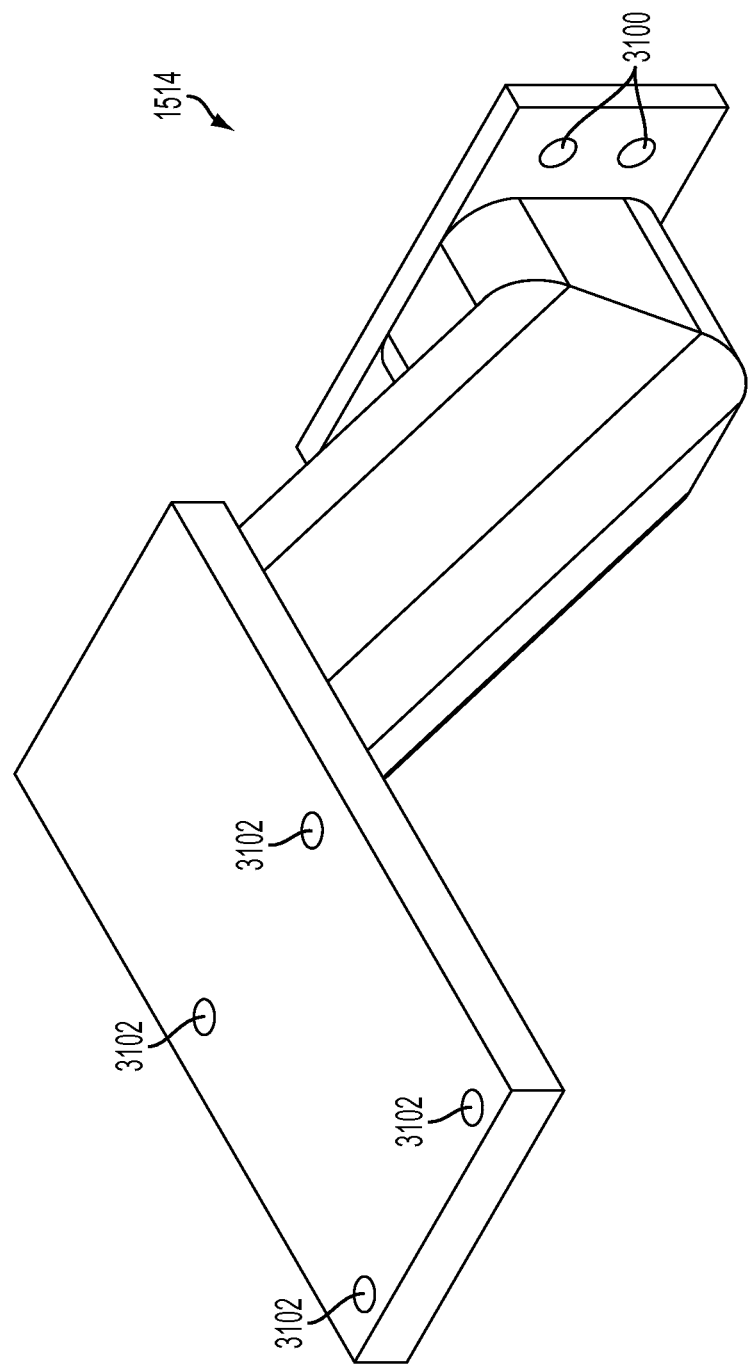
FIG. 31 is a perspective view of a goose neck connector of the mobile access unit of FIG. 22.

FIG. 31 is a perspective view of gooseneck weldment 1514, which is cut to define two sets of apertures 3100 and 3102 that allow the weldment to be connected to handle 1512 (FIG. 23) and to bracket 1910 (FIG. 26) of chariot portion 1502, as described in more detail below.

Most components of base portion 1404 are connected to platform 1500. Referring to FIGS. 23 through 31, for instance, brackets 1908 of chariot portion 1502 are bolted or otherwise connected, such as by rivets, to respective portions of side rail 1800 of platform 1500 via two sets of respective middle apertures 1822. A portion of handle 1512 is connected to front wheel 1504a, while another portion of the handle is connected to gooseneck weldment 1514 via apertures 3102. The gooseneck weldment is then connected to bracket 1910 of chariot portion 1502 via apertures 3100. Ladder adapters 1510 are bolted or otherwise connect, such as by rivets, to respective portions of crossbeams 1806 and 1804 and adapter supports 1816. Wheels 1504b are connected to platform 1500, as are jack stands 1508. H-frame 1506 is connected to platform 1500 by aligning apertures 2320 of the h-frame with a set of middle apertures 1822 of the platform and supplying fasteners, such as bolts or rivets, through the aligned apertures.

Figure 32:
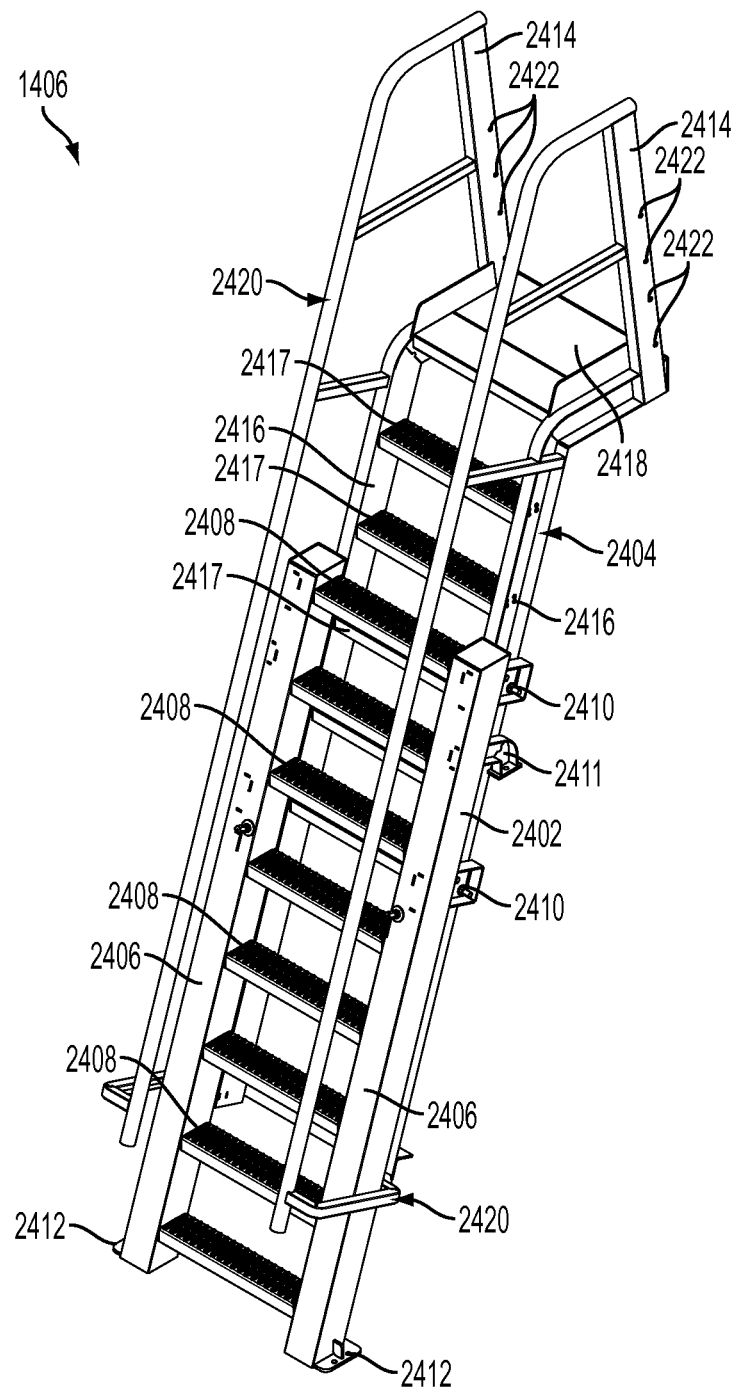
FIG. 32 is a perspective view of a ladder of the mobile access unit of FIG. 22.

FIG. 32 is a perspective view of ladder portion 1406 comprising a fixed portion 2402 and a moveable portion 2404. Fixed portion 2402 comprises a pair of uprights 2406 and a plurality of steps 2408. Moveable portion 2404 comprises a pair of uprights 2414, a pair of channeled supports 2416, a platform 2418, a plurality of steps 2417, and may include other components, such as a pair of handrail systems 2420.

Each of uprights 2406 is formed from a continuous piece of metal lasered or otherwise cut to define apertures to receive an end portion of each of steps 2408, similar in the manner side panel 1800 is lasered or otherwise cut to receive an end portion of each of crossbeams 1804 and 1806 as described above with respect to FIG. 25. Similarly, each of steps 2408 is formed from a continuous piece of tubular metal that is lasered or otherwise cut and then stamped to form the resulting step.

Each of uprights 2406 are also lasered or otherwise cut to define areas to receive a plurality of brackets 2410, 2411, and 2412. Brackets 2410 are configured to receive portions of moveable portion 2404 that allow the moveable portion to move up and down with respect to fixed portion 2402. Brackets 2411 are configured to connect to h-frame 1506 (FIG. 30), as described in more detail below. Brackets 2412 are lasered or otherwise cut to define apertures that align with apertures 2808 of ladder adapters 1510 as described above with respect to FIGS. 27 and 28.

Each of uprights 2414 is formed from a continuous piece of metal lasered or otherwise cut to define areas configured to receive portions of channel supports 2416 and handrail systems 2420 in a manner similar to that described above with respect to bump up component 300 of FIG. 10. Uprights 2414 are also lasered or otherwise cut to define a plurality apertures denoted at 2422 that are configured to align with apertures defined by angle braces 306 of bumpout weldments 200 described above with respect to FIG. 10 in order to connect ladder portion 1406 to cage 1408 (FIG. 22).

Each of channeled supports 2416 is formed from a continuous piece of channeled tubular metal, which is folded in a manner similar to that described above with respect to top rail 202 of FIG. 11. Platform 2418 is lasered and/or butterflied from a flat, continuous piece of sheet metal and stamped to form the resulting platform. It should be understood that channeled uprights 2416, brackets 2410 and handrail systems 2420 are configured to work together to enable moveable portion 2404 to move up and down with respect to fixed portion 2402 of ladder portion 1406. It should be understood, however, that movable portion 2404 may be bolted or otherwise fixed into place once it is configured at the desired height as described in more detail below. Steps 2417 are formed and connected to channel supports 2416 in ways similar to those described above with respect to steps 2408 and uprights 2406.

Referring to FIGS. 22, 23, 27, 28, 30, and 32, mobile access unit 1400 is formed by connecting ladder portion 1406 to base portion 1404. That is, brackets 2412 are fastened by one or more bolts or other suitable fasteners, such as rivets, to ladder adapters 1510 via apertures 2808 and those defined by brackets 2412. Brackets 2411 are fasted by a bolt or other suitable fastener to h-frame 1506 via apertures 2322 and those defined by brackets 2411. Additionally, the lose end of cable 2318 is connected to a portion of one of steps 2417.

Referring to FIGS. 14, 22, 23, and 30, cage 1408 and moveable portion 2404 may be raised to a desired height by using pulley system 2310. That is, rotation of crank 2316 causes wench 2314 to retract cable 2318 via pulley 2312, thereby asserting a pulling force on the step of steps 2417 to which the lose end of the cable is attached. Once cage 1408 and moveable portion 2404 reach a desired height, the moveable portion may be fixed into place by bolting or otherwise fastening it to fixed portion 2402. Mobile access unit 1400 may then be wheeled to a desired position using handle 1512 and wheels 1504. Once positioned as desired, jack stands 1508 may be used to fix mobile access unit 1400 in place. A user may then access a storage container such as via access point 1414 of tractor-trailer 1402 by climbing ladder portion 1406 of mobile access unit 1400.

It should be understood from the above description that the components of mobile access unit 1400 described above are modular and may be relocated with respect to platform 1500 and/or ladder portion 1406. Referring to FIGS. 23 and 24, for instance, chariot portion 1502, gooseneck weldment 1514, wheels 1504, and jack stands 1508 may be disconnected from platform 1500 and relocated at a position on the platform as desired using apertures 1820 and 1822. For example, chariot portion 1502, wheels 1504b, and jack stands 1508 may be disconnected from platform 1500, rotated about the platform in a clockwise manner, and reconnected to the platform at the relevant apertures. As a result, the direction of movement of mobile access unit 1400 may be changed by 90° with respect to ladder portion 1406.

Figure 33:
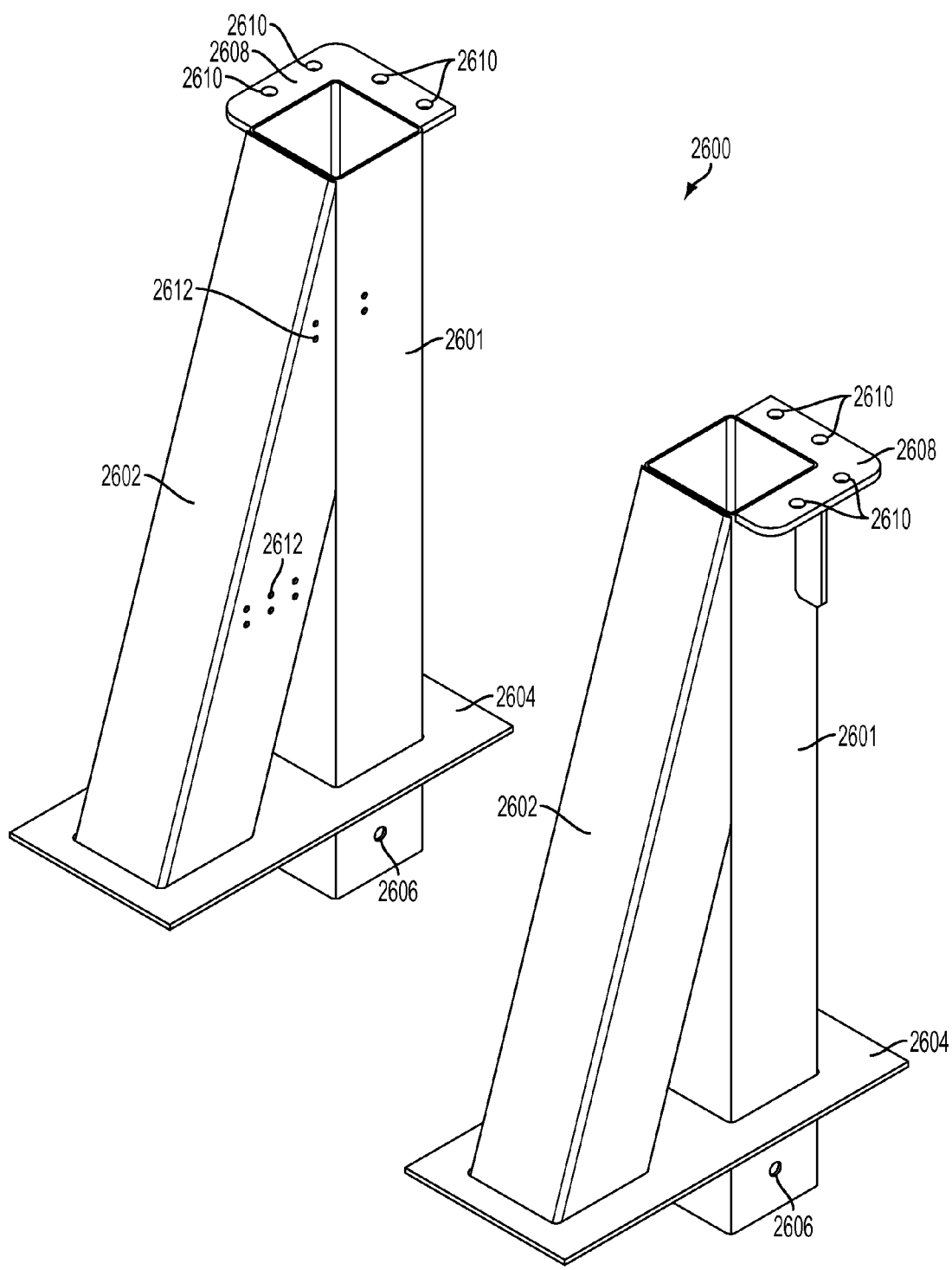
FIG. 33 is a perspective view of a pair of ladder adapters in accordance with an embodiment of the present invention.

FIG. 33 is a perspective view of a pair of ladder adapters 2600 that may be used to replace ladder adapters 1510 (FIGS. 22, 23, 27, 28, 29a) in order to increase the height of ladder portion 1406 in accordance with another embodiment of the present invention. Each of ladder adapters 2600 is comprised of tubular portions 2601 and 2602 and flat portion 2604. A lip portion 2608 similar to lip portion 2804 (FIGS. 27 and 28) is attached to each of ladder adapters 2600. Lip portions 2608 are cut to define a plurality of apertures 2610 similar to apertures 2808 (FIGS. 27 and 28).

Figure 34:
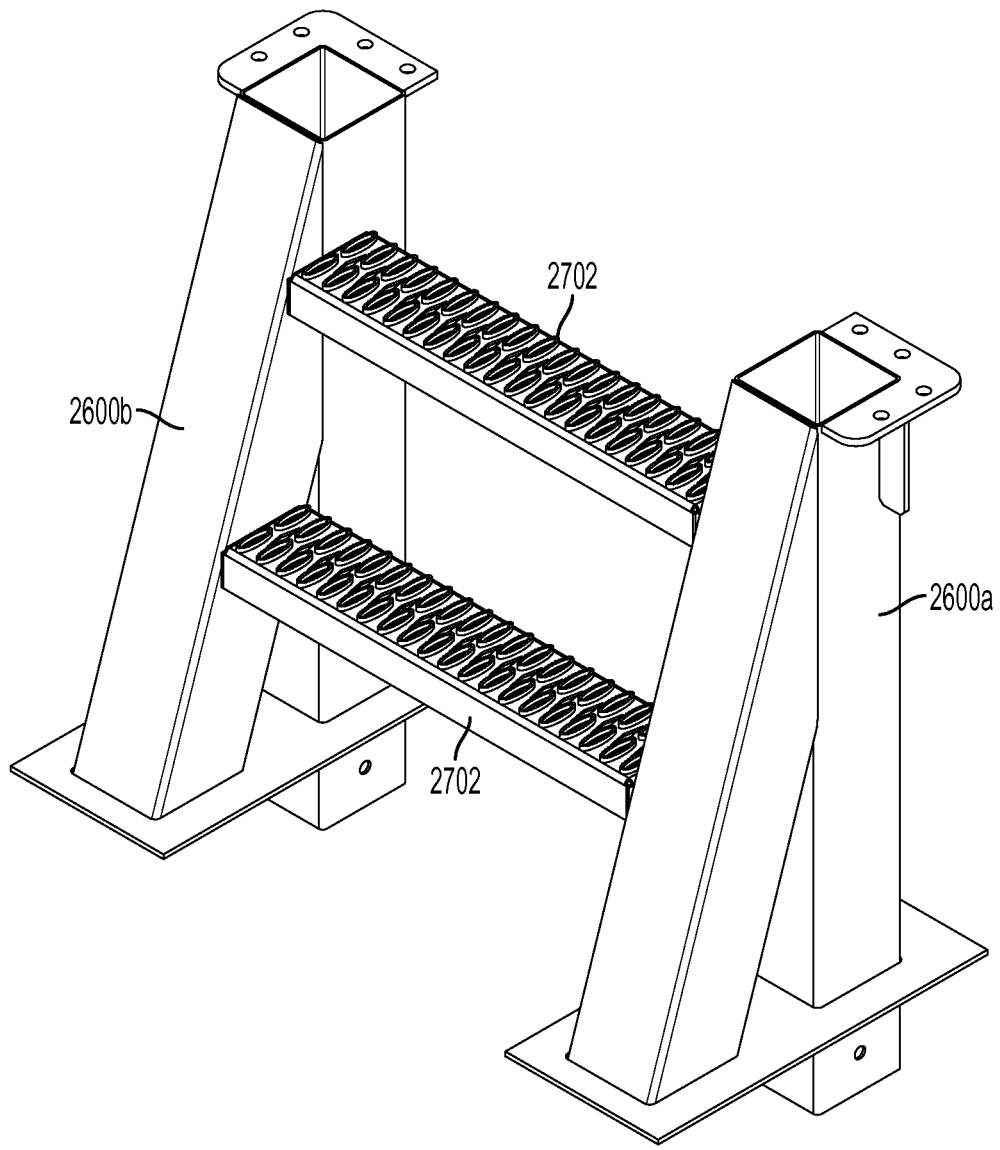
FIG. 34 is a perspective view of the pair of ladder adapters of FIG. 33 interconnected by a pair of supports.

Each of tubular portions 2601 are formed from a continuous piece of tubular metal and lasered or otherwise cut to define areas to receive respective tubular portions 2602 in a manner similar to that described above with respect to bump up component 300 and bump top braces 302 of FIG. 9, respectively. Similarly, each of tubular portions 2602 are formed from lasering or otherwise cutting a continuous piece of tubular metal. Each of tubular portions 2601 are lasered to define apertures 2606, which are similar to apertures 2806 of ladder adapters 1510 (FIGS. 27 and 28). Additionally, each of tubular portions 2601 and 2602 are lasered or otherwise cut to define sets of apertures 2612 configured to receive a pair of steps. Referring additionally to FIG. 34, for instance, a pair of steps 2702 is connected between ladder adapters 2600 in the presently-described embodiment. That is, ends of steps 2702 are inserted into apertures 2612. Steps 2702 are formed by lasering and/or butterflying and stamping a continuous piece of tubular metal in a manner similar to that described above with respect to steps 2408 and 2417 (FIG. 32).

Figure 35:
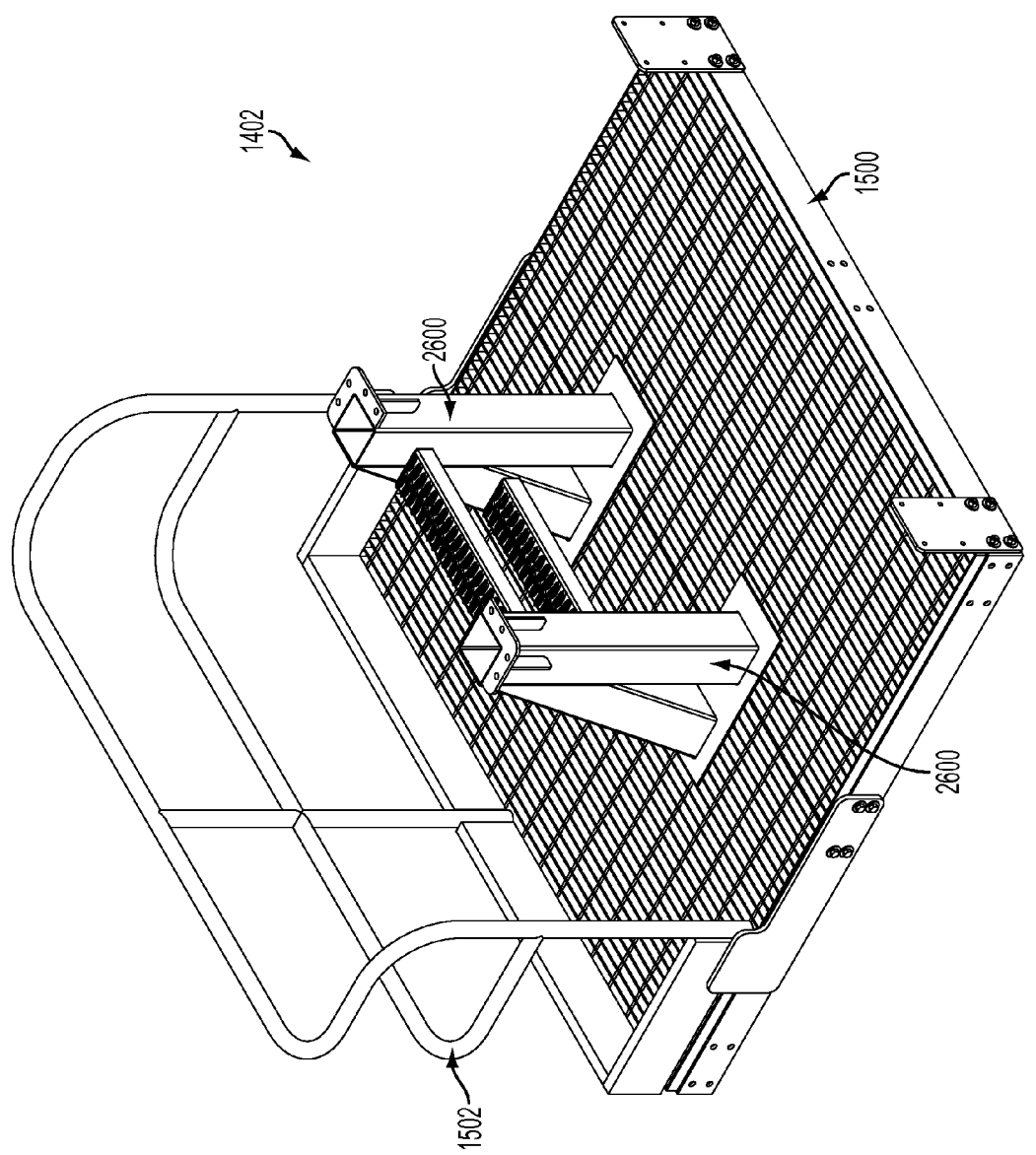
FIG. 35 is a perspective view of a base portion of a mobile access unit in accordance with an embodiment of the present invention.

FIG. 35 illustrates lower portion 1402 of mobile access unit 1400 (FIG. 14) where ladder adapters 2600 have replaced ladder adapters 1510 (FIGS. 23 and 29a). That is, ladder adapters 2600 are connected to platform 1500 in a manner similar to that described above with regard to the connection between ladder adapters 1510 and platform 1500 (FIGS. 25, 29a, and 29b). Ladder portion 1406 (FIG. 32) is connected to ladder adapters 2600 in a manner similar to that described above with respect to the connection between ladder adapters 1510 and ladder portion 1406 (FIGS. 22 and 23).

Figure 36:
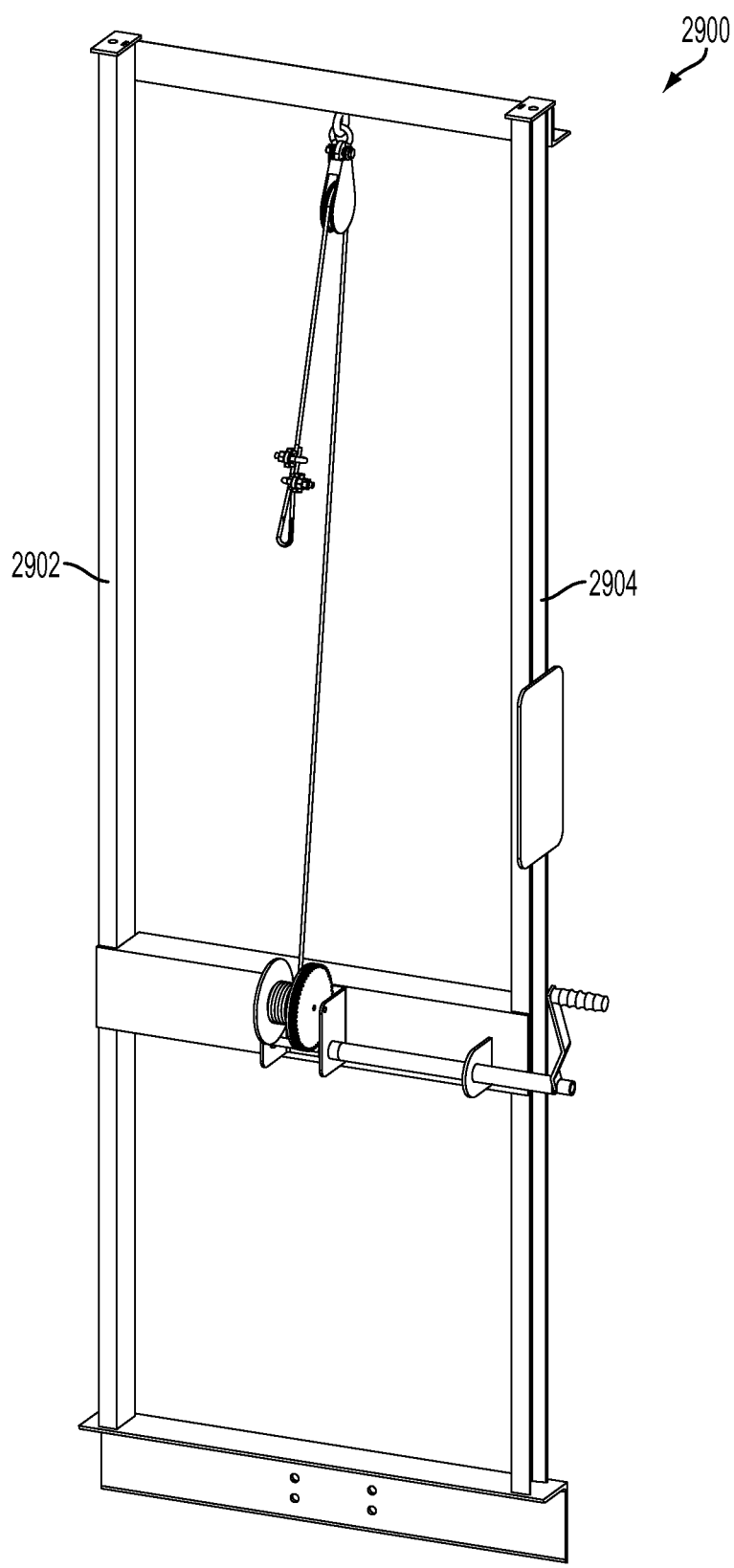
FIG. 36 is a perspective view of an h-frame in accordance with an embodiment of the present invention.

It should be understood that, because ladder adapters 2600 extend ladder portion 1406 to a greater height, an h-frame that is also greater in height a corresponding amount must be used. FIG. 36, for instance, illustrates an h-frame 2900 similar in construction and operation to h-frame 1506 (FIG. 30). However, uprights 2902 and 2904 are longer in length that uprights 2302 and 2304 (FIG. 30), respectively, in order to coincide with the greater height provided by ladder adapters 2600.

It should be understood that an embodiment utilizing ladder adapters 2600 provides a mobile access unit that extends to a height greater than that a mobile access unit utilizing ladder adapters 1510. The greater height is approximately equal to the difference in height between ladder adapters 1510 and ladder adapters 2600, or approximately two feet. It should also be understood that because ladder adapters 1510 and ladder adapters 2600 are exchangeable, the user of mobile access unit 1400 may configure the unit to the desired height for a task and may change it for another task by swapping out the ladder adapters.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A mobile access unit comprising:
a base portion having first and second apertures;
a plurality of wheels connected to said base portion to allow said base portion to be moved toward and away from a selected location;
a ladder adapter arrangement having a first pair of ladder adapters and a second pair of ladder adapters, said first and second pairs of ladder adapters configured to be inserted and secured into said first and second apertures, the first pair of ladder adapters having at least one adapter step extending therebetween to support a user, the first pair of ladder adapters having a first height configured to extend to a first location above a surface of said base portion, the second pair of ladder adapters having a second height configured to extend to a second location above said surface of said base portion, said first height being greater than said second height, wherein said ladder adapter arrangement is configured to allow a user to alternate between securing said first pair of ladder adapters and said second pairs of ladder adapters into the apertures; and
a ladder assembly having a first pair of uprights directly connected by ladder steps, the ladder assembly connected to said base portion by way of resting on top of a selected one of said pairs of ladder adapters, the ladder assembly configured to extend to multiple heights as a direct result of switching between the first and second pairs of ladder adapters.

2. A mobile access unit as set forth in claim 1, wherein said ladder assembly has a fixed portion and an extensible movable portion, said fixed portion being attached to said ladder adapter arrangement.

3. A mobile access unit as set forth in claim 2, further comprising a crank arrangement for moving said extensible movable portion of said ladder assembly.

4. A mobile access unit as set forth in claim 1, wherein said ladder assembly is mounted in a slant with respect to said base portion.

5. A mobile access unit as set forth in claim 4, further comprising a cage mounted to a distal end of said ladder assembly.

6. A mobile access unit as set forth in claim 5, wherein said cage comprises at least two horizontal rails formed of tubular material spaced apart by vertical supports.

7. A mobile access unit as set forth in claim 2, further comprising at least one jack stand connected to said base portion, said at least one jack stand being operative to prevent rolling movement of said base portion at said selected location.

8. A mobile access unit as set forth in claim 2, wherein each of said ladder adapters comprises a first tubular portion having a proximal end and a distal end, said proximal end is configured to extend below said surface of said base portion as said distal end is attached to said ladder assembly.

9. A mobile access unit as set forth in claim 8, wherein each of said ladder adapters of said first pair of ladder adapters comprises a second tubular portion attached obliquely to said first tubular portion of each of said ladder adapters of said first pair of ladder adapters.

10. A mobile access unit as set forth in claim 8, wherein each of said ladder adapters comprises a flat portion spaced apart from said proximal end of said first tubular portion so as to rest on said surface of said base portion.

11. A mobile access unit as set forth in claim 10, wherein each of said ladder adapters comprises a lip portion at said distal end of said first tubular portion, said lip portion defining at least one aperture for attachment of said ladder assembly.

12. A mobile access unit as set forth in claim 2, wherein said wheels are attached to said base portion such that said base portion is configured to move towards and away from said selected location along a direction of orientation of said ladder assembly.

13. A mobile access unit as set forth in claim 2, wherein said wheels are attached to said base portion such that said base portion is configured to move towards and away from said selected location along a direction lateral to a direction of orientation of said ladder assembly.

14. A mobile access unit as set forth in claim 1, wherein each of said ladder adapters comprises a first tubular portion having a proximal end and a distal end, said proximal end is configured to extend below said surface of said base portion as said distal end is attached to said ladder assembly.

15. A mobile access unit as set forth in claim 14, wherein each of said ladder adapters of said first pair of ladder adapters comprises a second tubular portion attached obliquely to said first tubular portion of each of said ladder adapters of said first pair of ladder adapters.

16. A mobile access unit as set forth in claim 14, wherein each of said ladder adapters comprises:
 a flat portion spaced apart from said proximal end of said first tubular portion so as to rest on said surface of said base portion; and
 a lip portion at said distal end of said first tubular portion, said lip portion defining at least one aperture for attachment of said ladder assembly.

17. A mobile access unit as set forth in claim 1, further comprising a cage mounted to a distal end of said ladder assembly.

* * * * *